US011956055B2

(12) United States Patent
Liu et al.

(10) Patent No.: US 11,956,055 B2
(45) Date of Patent: Apr. 9, 2024

(54) APPARATUS AND METHOD OF RECURSIVE TREE SEARCH BASED MULTIPLE-INPUT MULTIPLE-OUTPUT DETECTION

(71) Applicant: ZEKU TECHNOLOGY (SHANGHAI) CORP. LTD., Shanghai (CN)

(72) Inventors: Bin Liu, San Diego, CA (US); Hang Zhou, San Diego, CA (US); Chengzhi Li, San Diego, CA (US); Jian Gu, San Diego, CA (US)

(73) Assignee: ZEKU TECHNOLOGY (SHANGHAI) CORP. LTD., Shanghai (CN)

( * ) Notice: Subject to any disclaimer, the term of this patent is extended or adjusted under 35 U.S.C. 154(b) by 0 days.

(21) Appl. No.: 17/950,332

(22) Filed: Sep. 22, 2022

(65) Prior Publication Data

US 2023/0027975 A1 Jan. 26, 2023

Related U.S. Application Data

(63) Continuation of application No. PCT/US2021/015141, filed on Jan. 26, 2021.
(Continued)

(51) Int. Cl.
*H04B 7/08* (2006.01)
*H04L 25/03* (2006.01)

(52) U.S. Cl.
CPC ..... *H04B 7/0837* (2013.01); *H04L 25/03993* (2013.01)

(58) Field of Classification Search
CPC ............... H04B 7/0837; H04B 7/0697; H04L 25/03993
See application file for complete search history.

(56) References Cited

U.S. PATENT DOCUMENTS 6,785,341 B2 * 8/2004 Walton ................. H04B 7/0417
375/267
10,009,078 B2 * 6/2018 Asakura ................. H04L 5/023
(Continued)

FOREIGN PATENT DOCUMENTS

CA 2578222 A1 * 3/2006 ............. H04L 25/03

OTHER PUBLICATIONS

International Search Report issued in International application No. PCT/US2021/015141, dated Jun. 9, 2021.
(Continued)

*Primary Examiner* — Jean B Corrielus
(74) *Attorney, Agent, or Firm* — BAYES PLLC

(57) ABSTRACT

According to one aspect of the present disclosure, a baseband chip may be configured to receive a data stream associated with a channel. The baseband chip may be configured to select a first anchor point from the first constellation points of the first transmission layer. The baseband chip may be configured to select a first subset of constellation points from the first constellation points and the second constellation points. The baseband chip may be configured to perform a first iteration of a recursive tree search. The baseband chip may be configured to determine a first path metric based at least in part on the first iteration of the recursive tree search operation. The baseband chip may be configured to select a second anchor point from the second constellation points of the second transmission layer. The second anchor point may be associated with a second iteration of the recursive tree search.

20 Claims, 9 Drawing Sheets

Related U.S. Application Data

(60) Provisional application No. 63/024,845, filed on May 14, 2020.

(56) References Cited

U.S. PATENT DOCUMENTS

| | | |
|---|---|---|
| 11,342,969 B2 * | 5/2022 | Suh .................... H04B 7/0613 |
| 2007/0198719 A1 | 8/2007 | Su et al. |
| 2008/0181339 A1 | 7/2008 | Chen et al. |
| 2008/0279299 A1 | 11/2008 | Reuven et al. |
| 2009/0285325 A1 * | 11/2009 | Zhou ................ H04L 25/03343 375/267 |
| 2010/0002575 A1 * | 1/2010 | Eichinger ............... H04L 5/006 370/329 |
| 2015/0229373 A1 | 8/2015 | Lee et al. |
| 2018/0063820 A1 | 3/2018 | Xiong et al. |
| 2018/0248719 A1 * | 8/2018 | Horvat ............. H04L 25/03891 |

OTHER PUBLICATIONS

Written Opinion of the International Searching Authority issued in International application No. PCT/US2021/015141, dated Jun. 9, 2021.

* cited by examiner

APPARATUS AND METHOD OF RECURSIVE TREE SEARCH BASED MULTIPLE-INPUT MULTIPLE-OUTPUT DETECTION

CROSS-REFERENCE TO RELATED APPLICATIONS

This application is a continuation of International Application No. PCT/US2021/015141, filed Jan. 26, 2021, which claims the benefit of priority to U.S. Provisional Application No. 63/024,845, filed May 14, 2020, entitled "METHOD OF RECURSIVE TREE SEARCH BASED MIMO DETECTION," both of which are hereby incorporated by reference in their entireties.

BACKGROUND

Embodiments of the present disclosure relate to apparatus and method for wireless communication.

Wireless communication systems are widely deployed to provide various telecommunication services such as telephony, video, data, messaging, and broadcasts. In cellular communication, such as the 4th-generation (4G) Long Term Evolution (LTE) and the 5th-generation (5G) New Radio (NR), the 3rd Generation Partnership Project (3GPP) defines various mechanisms for signal detection, e.g., such as multiple-input multiple-output (MIMO) detection.

SUMMARY

Embodiments of apparatus and method for recursive tree search-based MIMO detection are disclosed herein.

According to another aspect of the present disclosure, a baseband chip including a memory and at least one processor coupled to the memory is configured to perform various operations. In some embodiments, the at least one processor is configured to receive a data stream associated with a channel. In certain aspects, the channel including a plurality of transmission layers. In certain other aspects, the plurality of transmission layers may include a first transmission layer associated with first constellation points and a second transmission layer associated with second constellation points. In some other embodiments, the at least one processor may be configured to select a first anchor point from the first constellation points of the first transmission layer. In some other embodiments, the at least one processor may be configured to select, based at least in part on the first anchor point, a first subset of constellation points from the first constellation points and the second constellation points. In some other embodiments, the at least one processor may be configured to perform a first iteration of a recursive tree search operation based at least in part on the first anchor point and the associated first subset of constellation points. In some other embodiments, the at least one processor may be configured to determine a first path metric/path based at least in part on the first iteration of the recursive tree search operation. In some other embodiments, the at least one processor may be configured to select, based at least in part on the first path metric/path, a second anchor point from the second constellation points of the second transmission layer. In certain aspects, the second anchor point may be associated with a second iteration of the recursive tree search operation.

According to one aspect of the present disclosure, a baseband chip including a memory and at least one processor coupled to the memory is configured to perform various operations. In some embodiments, the at least one processor is configured to receive a data stream associated with a channel. In certain aspects, the channel may include a plurality of transmission layers. In certain other aspects, the plurality of transmission layers may include a first and a second transmission layers associated with a resource block (RB). In certain aspects, the RB may include at least one reference resource element (RE) and a plurality of data REs. In some other embodiments, the at least one processor is configured to perform an initial noise estimation of the channel based at least in part on the reference RE. In some other embodiments, the at least one processor is configured to perform a noise whitening operation for the channel based at least in part on the initial noise estimation. In some other embodiments, the at least one processor is configured to perform, for the first RB, a first iteration of a recursive tree search operation for each of the plurality of first data REs to determine a first symbol estimate associated with the first and the second transmission layers. In some other embodiments, the at least one processor is configured to perform a subsequent noise estimation of the channel based at least in part on the reference RE, the plurality of data REs, and the first symbol estimate with the first iteration.

According to another aspect of the present disclosure, a method is disclosed that may include receiving a data stream associated with a channel. In certain aspects, the channel may include a plurality of transmission layers. In certain other aspects, the plurality of transmission layers may include a first transmission layer associated with first constellation points and a second transmission layer associated with second constellation points. In some other embodiments, the method may include selecting a first anchor point from the first constellation points of the first transmission layer. In some other embodiments, the method may include selecting, based at least in part on the first anchor point, a first subset of constellation points from the first constellation points. In some other embodiments, the method may include performing a first iteration of a recursive tree search operation based at least in part on the first anchor point and the first subset of constellation points. In some other embodiments, the method may include determining a first best path based on the path metric from the first iteration of the recursive tree search operation. In some other embodiments, the method may include selecting, based at least in part on the first best path, a second anchor point from the second constellation points of the second transmission layer. The second anchor point is associated with a second iteration of the recursive tree search operation.

According to another aspect of the present disclosure, a method is disclosed that may include receiving a data stream associated with a channel. In certain aspects, the channel may include a plurality of transmission layers. In certain other aspects, the plurality of transmission layers may include a first and a second transmission layers associated with an RB. In certain other aspects, the RB may include at least one reference RE and a plurality of data REs. In some embodiments, the method may further include performing an initial noise estimation of the channel based at least in part on the reference RE. In some embodiments, the method may further include performing a first noise whitening operation for the channel based at least in part on the initial noise estimation. In some embodiments, the method may further include performing, for the RB, a first iteration of a recursive tree search operation for each of the plurality of data REs to determine a first symbol estimate for the first and the second transmission layers. In some embodiments, the method may further include performing a subsequent noise estimation of the channel based at least in part on the reference RE, the plurality of estimated data REs associated with the first iteration.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
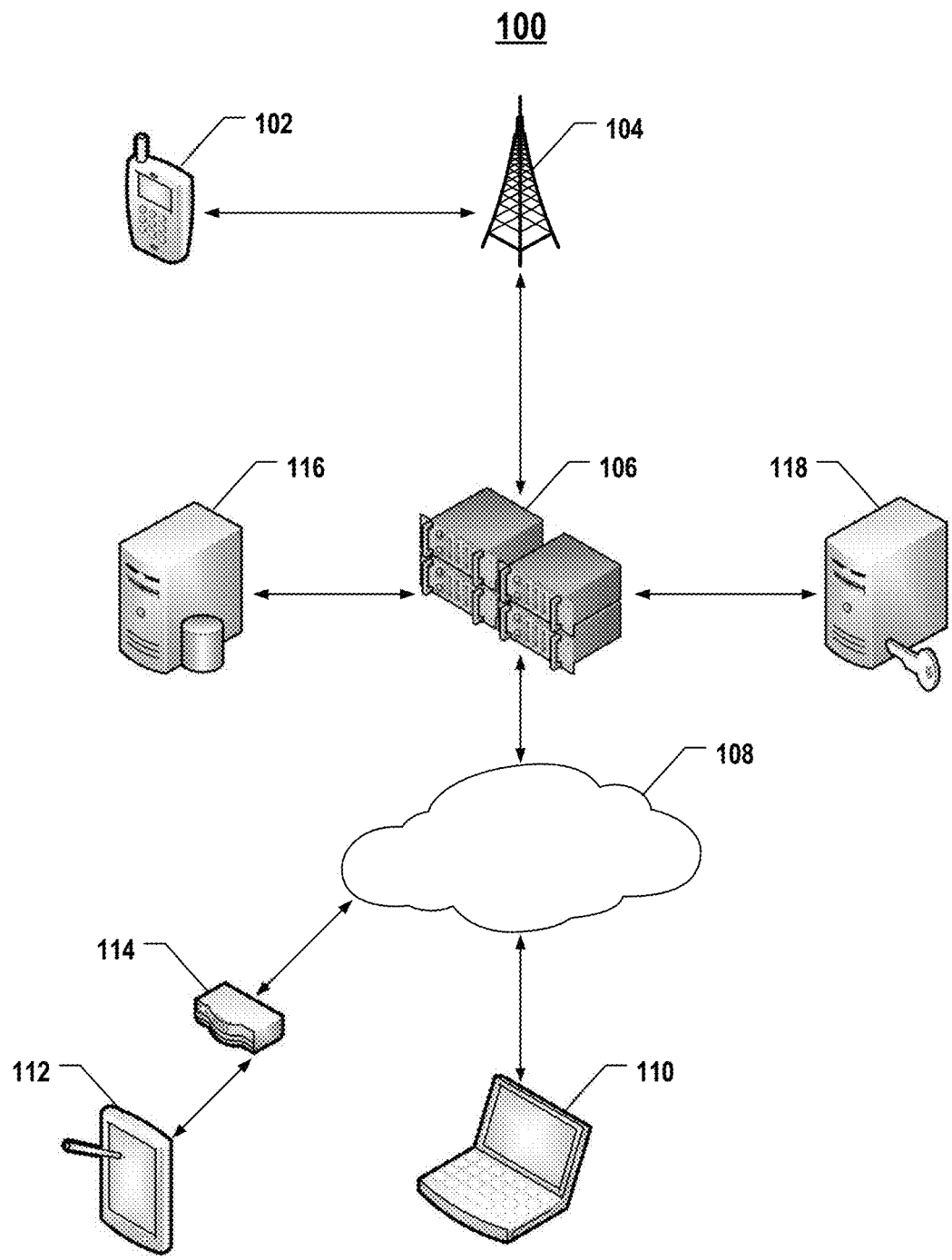
FIG. 1 illustrates an exemplary wireless network, according to some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-1-DMA) system, wireless local area network (WLAN) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as the Global System for Mobile Communications (GSM). An OFDMA network may implement a RAT, such as LTE or NR. A WLAN system may implement a RAT, such as Wi-Fi. The techniques described herein may be used for the wireless networks and RATs mentioned above, as well as other wireless networks and RATs.

Multiple-input multiple-output (MIMO) technology constitutes the basis for various wireless communication systems, e.g., such as 3G, LTE, and NR, just to name a few. In a MIMO system, both the transmitter and the receiver are equipped with multiple antennas. Multiple data streams can be delivered simultaneously to the receiver with spatial multiplexing. Each data stream may be associated with a transmission layer. Spatial multiplexing provides high spectral efficiency, but comes at the cost of increased signal processing complexity, most prominently in the MIMO detector of the baseband chip, which may be used to recover the data stream from the channel and noise/interference.

For a MIMO system with N transmission layers and M receiver antennas, the mathematical system model can be described using Equation (1):

$$y = Hx + n \quad (1),$$

where $y \in \mathbb{C}^M$ is the received signal vector; $x \in \mathbb{M}^N$ is the transmitted quadrature amplitude modulation (QAM) symbol vector where $\mathbb{M}$ is the set of possible QAM symbols for a particular modulation order m (e.g., m=2 for quadrature phase shift keying (QPSK), m=4 for 16 QAM, m=6 for 64

QAM, m=8 for 256 QAM, m=10 for 1024 QAM, etc.); H∈ $\mathbb{C}^{M \times N}$ is the complex channel matrix; and n∈ $\mathbb{C}^M$ is the white Gaussian noise vector.

After performing noise whitening on the received signal and estimated channel, n may be a complex additive white Gaussian noise vector with units of variance and may be considered uncorrelated across vector elements, e.g., noise covariance matrix $\Phi_n = I_M$. The baseband chip may be configured to perform MIMO detection to estimate x given the whitened estimated channel matrix Ĥ and whitened received signal vector ŷ.

Among the various types of MIMO detection techniques, maximum likelihood detection (MLD) provides the best theoretical error performance. With the above system model, given the assumption of white noise $\Phi_n = I_N$, the maximum likelihood (ML) solution is equivalent to solving the least squares problem of Equation (2):

$$\hat{x}_{ML} = \underset{x \in \mathbb{M}^N}{\operatorname{argmin}} \|\hat{y} - \hat{H}x\|^2, \qquad (2)$$

where $\hat{x}_{ML}$ is the ML of the estimated transmitted QAM symbol vector.

In certain implementations, the least squares problem may be solved by means of QR decomposition techniques, e.g., by performing QR decomposition on Ĥ=QR, where Q∈ $\mathbb{C}^{M \times M}$ is an orthogonal matrix and R∈ $\mathbb{C}^{M \times N}$ is an upper triangular matrix. It may be assumed that, without loss of generality, the number of receiver antennas is greater than or equal to the number of transmission layers, e.g., M≥N. Under this assumption, the lower M–N rows of upper triangular matrix R are always zeros, and thus only the upper N×N square and upper rows of the triangular matrix are meaningful. By processing received vector y with $Q^H$, e.g., $\bar{y} = Q^H \hat{y}$, which is a sufficient statistic of ŷ, the system model can be transformed as seen below in Equation (3):

$$\bar{y} = Q^H y = Rx + \bar{n} \qquad (3),$$

where $\bar{n}$ is still an uncorrelated white Gaussian noise vector with $\Phi_{\bar{n}} = I_N$. Thus, the problem of finding the ML solution can be equivalent to solving Equation (4):

$$\hat{x}_{ML} = \underset{x \in \mathbb{M}^N}{\operatorname{argmin}} \|\bar{y} - Rx\|^2. \qquad (4)$$

By way of example and not limitation, given a system with four transmission layers and four receiver antennas (e.g., 4×4 system), Equation (4) may be expressed as:

$$\begin{bmatrix} \bar{y}_0 \\ \bar{y}_1 \\ \bar{y}_2 \\ \bar{y}_3 \end{bmatrix} = \begin{bmatrix} r_{00} & r_{01} & r_{02} & r_{03} \\ 0 & r_{11} & r_{12} & r_{13} \\ 0 & 0 & r_{22} & r_{23} \\ 0 & 0 & 0 & r_{33} \end{bmatrix} \begin{bmatrix} x_0 \\ x_1 \\ x_2 \\ x_3 \end{bmatrix}.$$

For a hard-output detection scheme, such as Vertical-Bell Laboratories Layered Space-Time (V-BLAST), the detection starts from layer 3 by solving Equation (5):

$$\hat{x}_3 = \underset{x \in \mathbb{M}}{\operatorname{argmin}} \|\bar{y}_3 - r_{33}x\|^2. \qquad (5)$$

Then, layer-2 can be detected by canceling the detection result for layer-3 as seen below in Equation (6):

$$\hat{x}_2 = \underset{x \in \mathbb{M}}{\operatorname{argmin}} \|\bar{y}_2 - r_{23}\hat{x}_3 - r_{33}x\|^2. \qquad (6)$$

The successive interference cancelation/back-substitution process performed on layer-2 may be iteratively performed for layers 1 and 0. This class of techniques suffers from error propagation, however. Namely, the detection error for layer k can negatively impact the detection of layers k–1, . . . , 0. Therefore, the transmission layers can be ordered such that stronger layers are detected first to minimize the error propagation issue.

On the other hand, a soft-output detection scheme based on ML detection essentially searches over the vector space of all $x \in \mathbb{M}^N$ for solutions to Equation (4). It can be shown that the problem in Equation (4) can then be transformed to an equivalent QAM symbol-tree search problem where a root-to-leaf tree path represents a transmitted QAM symbol vector based at least in part on the upper-triangular matrix R. Such a QAM symbol vector is of length N and may include QAM symbols from those N transmission layers. The search result for one iteration of the tree-search may be a path metric representative of one or more QAM symbols.

Soft-output (e.g., log-likelihood ratio(s) (LLR)) of the QAM symbol vector may be calculated based on the best path metric resulting in the tree-search (e.g., max-log-maximum-a-posteriori (MAP)), or a subset of the path metric (e.g., approximated logMAP). The increased performance for the soft-output system is achieved at the cost of higher computational complexity associated with the tree search. As the modulation order m and/or the number of transmission layers N increases, the size of the tree, and thus the computational complexity of the ML detection algorithm increases exponentially. Thus, even for conventional near-MLD schemes that reduce computational complexity by limiting the number of paths in the tree search, the computational resources used to perform such calculations are still undesirably high for higher order QAM, e.g., 16 QAM, 64 QAM, 256 QAM, 1024 QAM, etc.

There are different categories of MIMO detectors. Such categories may include, for example, linear MIMO detectors (e.g., minimum mean squared error (MMSE) MIMO detectors, maximum ratio combining (MRC) MIMO detectors, zero forcing (ZF) MIMO detectors, etc.), sphere decoding-based MIMO detector (e.g., breadth-first based tree-search MIMO detector, depth-first based tree-search MIMO detector, best-first based tree-search MIMO detector, etc.), and interference cancellation aided MIMO detectors, just to name a few. Among these categories, sphere decoding-based MIMO detectors provide design flexibility in the tradeoff between approaching the optimum ML performance and reducing computational complexity.

In many implementations, the optimal solution for decoding spatially multiplexed signals is ML, which involves an exhaustive tree search of multiple dimensions and is particularly beneficial for use in high-performance applications. Spherical decoding is one an iterative method for computing an ML estimate. Like the ML algorithm, spherical decoding finds the lattice points closest to the received vector, but the search is limited to a subset of constellation points located inside a sphere centered at the received vector. Limiting the search to a subset of constellation points may provide a significant reduction in computational complexity. Hence, spherical decoding offers a computationally efficient decoding algorithm with ML performance. One of the problems in implementing spherical decoding, however, lies in the fact that the number of iterations per realization is neither defined nor bounded. Thus, conventional spherical decoding may not be suitable for certain hardware implementations.

One such type of spherical decoding tree search algorithm is the conventional fixed-complexity tree search algorithm. The fixed-complexity tree search algorithm limits the total number of candidate constellation points tested in each layer N, thereby reducing the complexity of the computations performed by the MIMO detector. The fixed-complexity tree search MIMO detector provides a beneficial performance-complexity tradeoff. One example of a conventional fixed-complexity tree search algorithm is the so-called N–1–1–1 tree search, which is described below in connection with FIGS. 8 and 9.

Moreover, in an OFDMA system, the reference resource element (RE) used for channel and noise estimation is limited and scattered in both time and frequency directions to limit system overhead. Moreover, due to the nature of random interference, the interference is in general imbalanced across both time and frequency directions. Thus, to average over frequency and time may not be a viable solution in improving the estimation performance With a limited number of available reference signals, conventional noise/interference covariance estimation techniques are far from accurate. One conventional technique utilizes data REs in noise/interference covariance estimation as well. However, the data symbol is unknown when noise covariance estimation is conducted, thus limiting the accuracy of noise covariance estimation.

Figure 8:
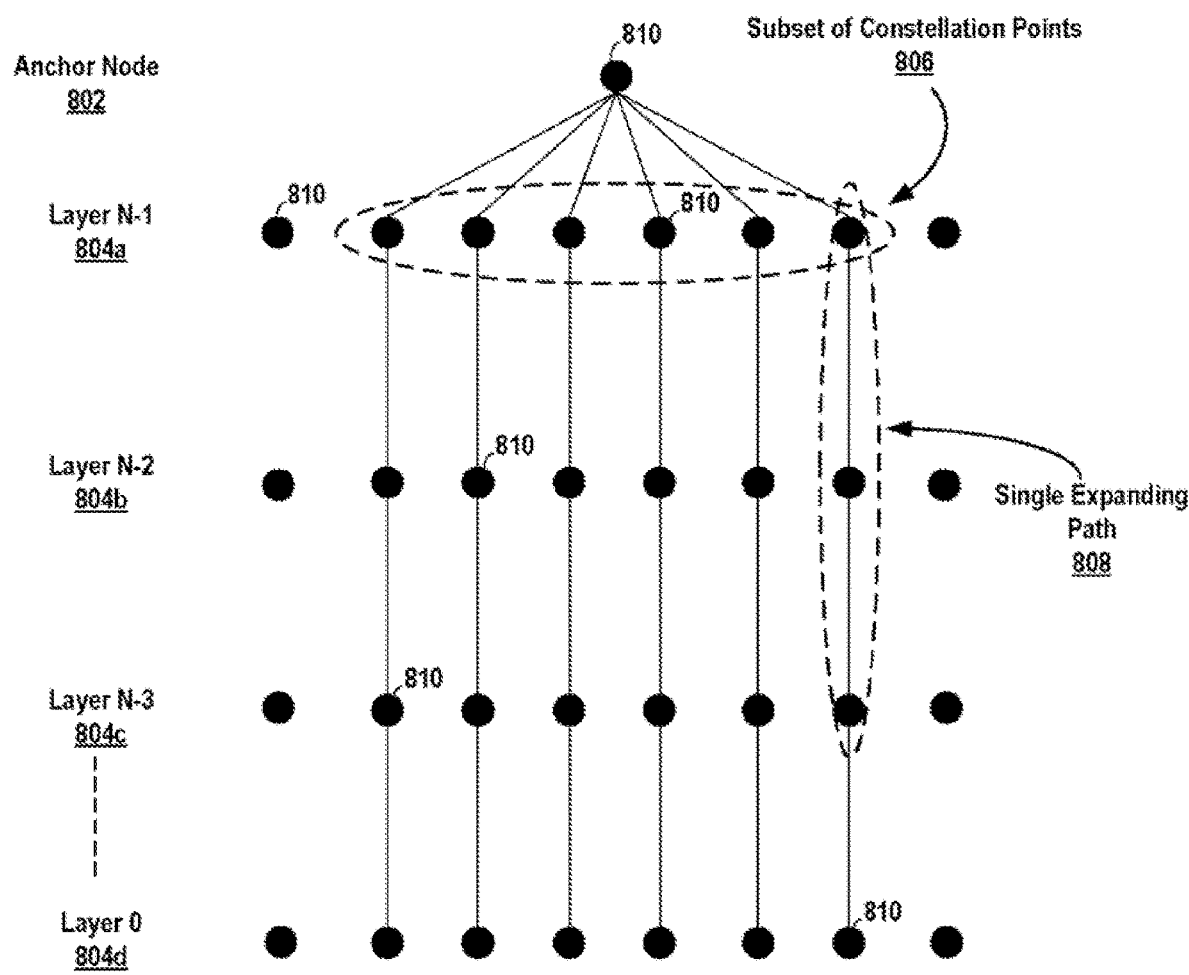
FIG. 8 illustrates a lattice structure that may be used in a conventional fixed-complexity tree search.

FIG. 8 illustrates a lattice 800 that may be used in a conventional fixed-complexity tree search. For example, lattice 800 may be used for an N–1–1–1 tree search. As seen in FIG. 8, the lattice 800 includes an anchor point 802, a bottom layer N–1 804*a*, a second layer N–2 804*b*, a third layer N–3 804*c*, and a fourth layer 0 804*d*. Each of the layers 804*a*, 804*b*, 804*c*, 804*d* in lattice 800 includes a set of eight constellation points 810. In the example illustrated in FIG. 8, the subset of selected constellation points 806 includes the middle six constellation points 806. The anchor point for bottom layer N–1 804*a* is selected based on QAM slicing.

As illustrated in FIG. 8, the tree search starts from the bottom layer (e.g., Layer N–1 804*a*) with a preselected subset of constellation points 806. Starting from Layer N–1 804*a*, the path 808 evolves by finding the best child node along each path. The child node is determined by direct constellation slicing after removing the interference from the previous layers. The N subset of constellation points 806 selected in the bottom layer N–1 804*a* can be a full set of the constellation points (not shown) in the case of smaller modulation orders (e.g., QPSK, 16 QAM, etc.) or a subset in the case of larger modulation orders (e.g., 64 QAM, 256 QAM, 1024 QAM, etc.).

The reduced number of candidate paths explored in N–1–1–1 or other reduced complexity tree search algorithm may lead to insufficient statistics in generated LLR, and thus impair the MIMO detector's performance, especially in correlated channel and/or high modulation order. To improve the LLR quality, a multiple QR+tree search may be performed in parallel for each permutation of transmission layer ordering such that one QR+tree search for each permutation is performed. Additional details of which are described below in connection with FIG. 9.

Figure 9:
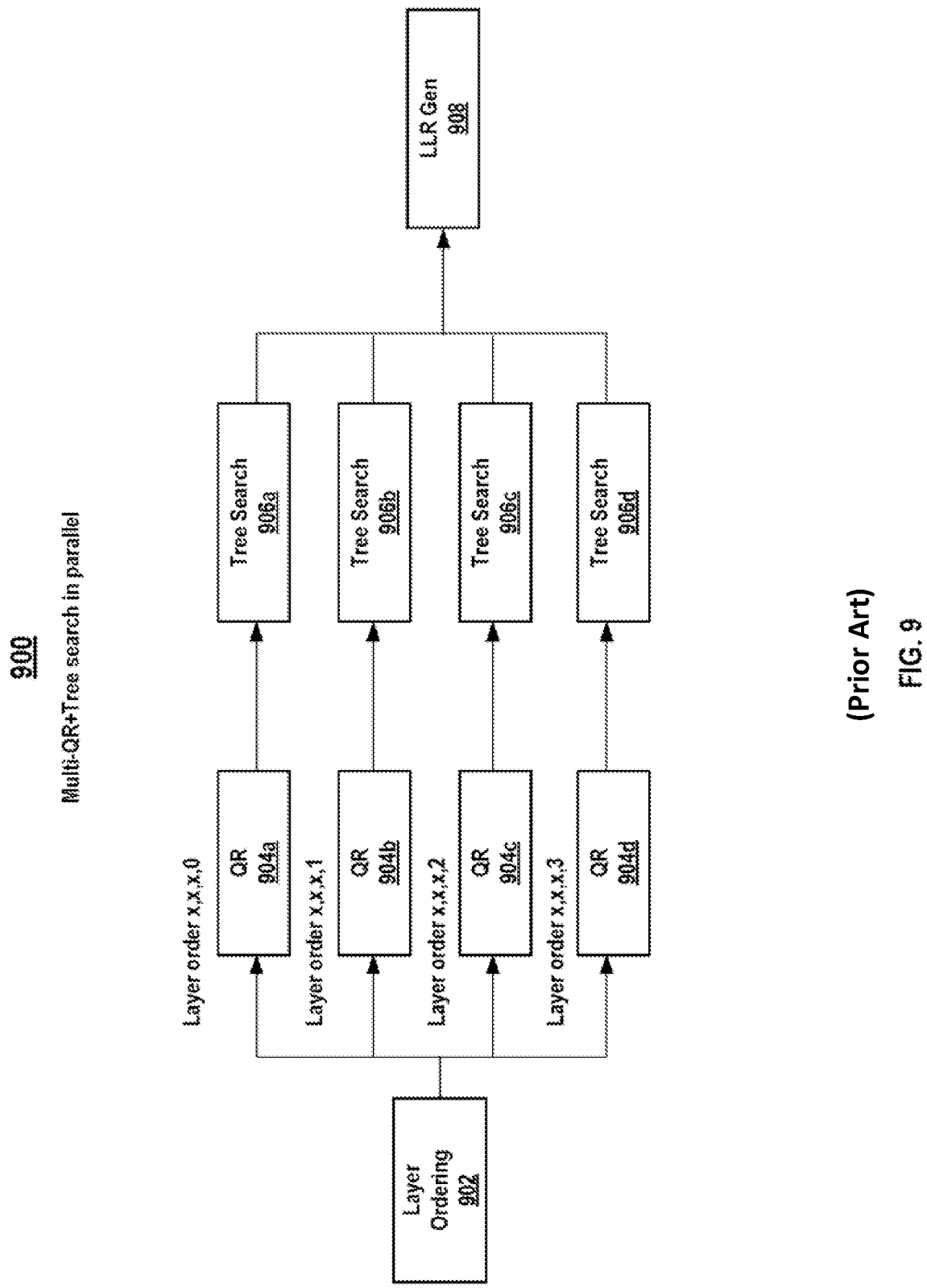
FIG. 9 illustrates a block diagram of a conventional baseband chip.

FIG. 9 illustrates a parallel architecture of a conventional MIMO detector 900 that may perform multiple QR+tree searches in parallel. The conventional MIMO detector 900 illustrated in FIG. 9 may be part of a 4×4 system. Thus, four QR+tree searches may be performed in parallel. As illustrated in FIG. 9, MIMO detector 900 may include a layer ordering component 902 configured to order the different N transmission layers such that four combinations of layer ordering in which each transmission layer is searched are searched in parallel. Each of the QR components 904*a*, 904*b*, 904*c*, 904*d* may be configured to perform QR decomposition of the complex channel matrix H based on respective layer ordering. The $\hat{H}$ and $\hat{y}$ (which is $Q^{-1}y$) output by each of the QR components 904*a*, 904*b*, 904*c*, 904*d* may be input into its respective tree search unit 906*a*, 906*b*, 906*c*, 906*d*, which may perform a fixed complexity tree search to determine a path metric based on that layer ordering. Each of the selected four path metrics may be input into a LLR component 908, which is configured to estimate the QAM symbol(s) of the received data stream. However, statistical errors associated with the path metrics for transmission layers with weaker signal power (e.g., layer-0, layer-1, etc.) may limit the accuracy of the generated LLR for the QAM symbol, and hence, the performance of the baseband chip with such a MIMO detector.

Thus, there exists an unmet need for a baseband chip that performs a multiple QR+tree search with reduced complexity and improved accuracy of the LLR as compared to the conventional techniques described above.

The baseband chip of the present disclosure provides a solution by performing multiple QR+tree searches in a sequential manner Namely, the baseband chip described below may be configured to perform a recursive QR+Tree search. The later-stage tree searches associated with the low power transmission layers (e.g., layer-0, layer-1, layer-2, etc.) may take advantage of the statistics generated in the previous tree search(es) for the higher power transmission layer(s) (e.g., layer-3, layer-2, layer-1), thereby increasing the accuracy of the LLR calculation, e.g., as described below in connection with FIG. 3.

Considering recursive QR+tree search framework of the present disclosure, the consecutive iterations can take advantage of the previous iterations by using the estimated data symbols to help improve the noise/interference estimation as well, e.g., as described below in connection with FIG. 4.

FIG. 1 illustrates an exemplary wireless network 100, in which certain aspects of the present disclosure may be implemented, according to some embodiments of the present disclosure. As shown in FIG. 1, wireless network 100 may include a network of nodes, such as a user equipment (UE) 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. It is understood that access node 104 is illustrated by a radio tower by way of illustration and not by way of limitation.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF) device, a session management function (SMF) device, or a user plane function (UPF) device, of a core network for the NR system. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the specific entity to perform user equipment authentication. In some embodiments, a single server rack may handle multiple such functions, such that the connections between core network element 106, authentication server 118, and database 116, may be local connections within a single rack.

Figure 7:
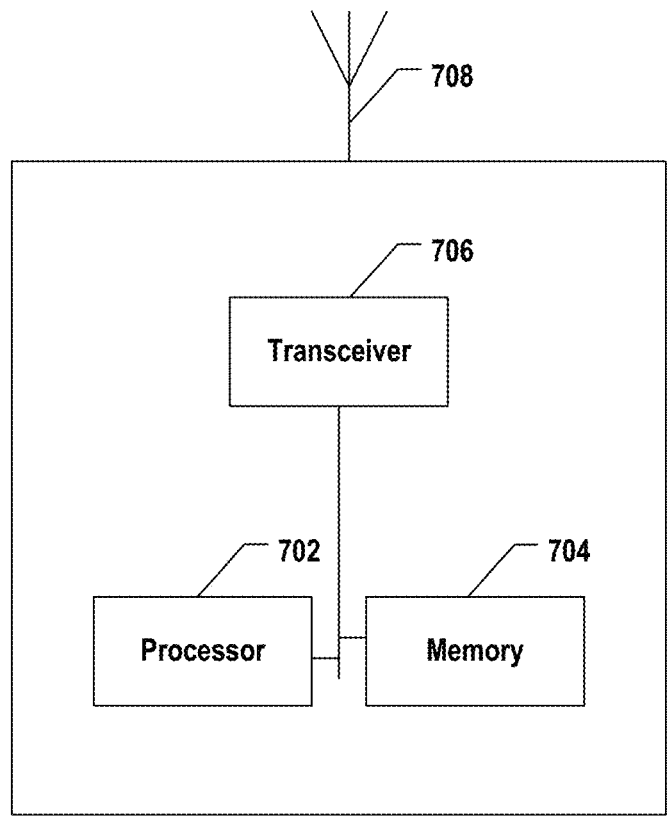
FIG. 7 illustrates a block diagram of an exemplary node, according to some embodiments of the present disclosure.

Each element in FIG. 1 may be considered a node of wireless network 100. More detail regarding the possible implementation of a node is provided by way of example in the description of a node 700 in FIG. 7. Node 700 may be configured as user equipment 102, access node 104, or core network element 106 in FIG. 1. Similarly, node 700 may also be configured as computer 110, router 114, tablet 112, database 116, or authentication server 118 in FIG. 1. As shown in FIG. 7, node 700 may include a processor 702, a memory 704, and a transceiver 706. These components are shown as connected to one another by a bus, but other connection types are also permitted. When node 700 is user equipment 102, additional components may also be included, such as a user interface (UI), sensors, and the like. Similarly, node 700 may be implemented as a blade in a server system when node 700 is configured as core network element 106. Other implementations are also possible.

Transceiver 706 may include any suitable device for sending and/or receiving data. Node 700 may include one or more transceivers, although only one transceiver 706 is shown for simplicity of illustration. An antenna 708 is shown as a possible communication mechanism for node 700. Multiple antennas and/or arrays of antennas may be utilized for receiving multiple spatially multiplex data streams. Additionally, examples of node 700 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 7, node 700 may include processor 702. Although only one processor is shown, it is understood that multiple processors can be included. Processor 702 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 702 may be a hardware device having one or more processing cores. Processor 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 7, node 700 may also include memory 704. Although only one memory is shown, it is understood that multiple memories can be included. Memory 704 can broadly include both memory and storage. For example, memory 704 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 702. Broadly, memory 704 may be embodied by any computer-readable medium, such as a non-transitory computer-readable medium.

Processor 702, memory 704, and transceiver 706 may be implemented in various forms in node 700 for performing wireless communication functions. In some embodiments, processor 702, memory 704, and transceiver 706 of node 700 are implemented (e.g., integrated) on one or more system-on-chips (SoCs). In one example, processor 702 and memory 704 may be integrated on an application processor (AP) SoC (sometimes known as a "host," referred to herein as a "host chip") that handles application processing in an operating system (OS) environment, including generating raw data to be transmitted. In another example, processor 702 and memory 704 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 702 and transceiver 706 (and memory 704 in some cases) may be integrated on an RF SoC (sometimes known as a "transceiver," referred to herein as an "RF chip") that transmits and receives RF signals with antenna 708. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, in some embodiments, any suitable node of wireless network 100 (e.g., user equipment 102 or access node 104) in transmitting signals to another node, for example, from user equipment 102 to access node 104 via, or vice versa, may process a MIMO data stream by performing a recursive QR+tree search, as described below in detail. As a result, compared with known solutions in which the statistics generated for the transmission layers received with higher power are not used in subsequent tree searches for the transmission layers received with lower power, the accuracy of the LLR calculation(s) may be improved while reducing the computational complexity.

Figure 2:
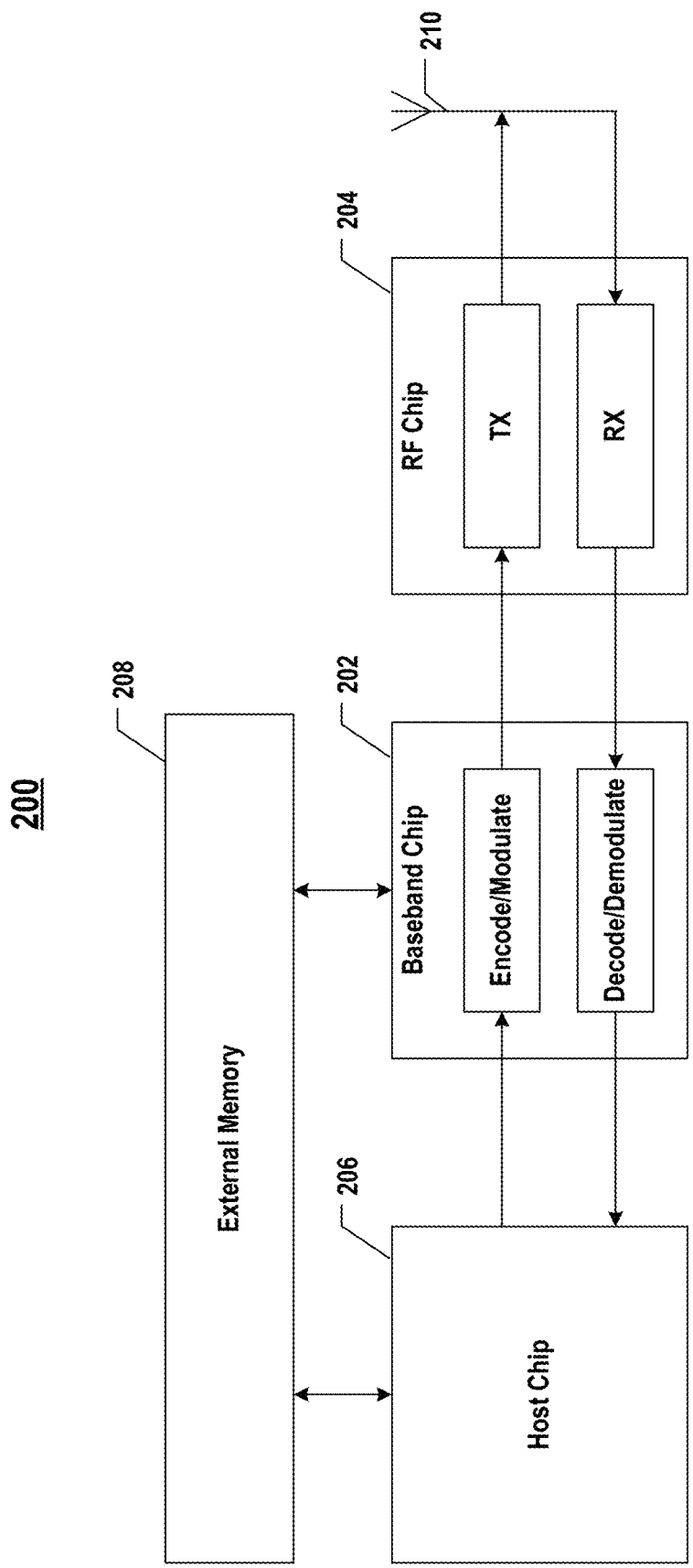
FIG. 2 illustrates a block diagram of an apparatus including a baseband chip, a radio frequency (RF) chip, and a host chip, according to some embodiments of the present disclosure.

FIG. 2 illustrates a block diagram of an apparatus 200 including a baseband chip 202, an RF chip 204, and a host chip 206, according to some embodiments of the present disclosure. Apparatus 200 may be an example of any suitable node of wireless network 100 in FIG. 1, such as user equipment 102 or access node 104. As shown in FIG. 2, apparatus 200 may include baseband chip 202, RF chip 204, host chip 206, and one or more antennas 210. In some embodiments, baseband chip 202 is implemented by processor 702 and memory 704, and RF chip 204 is implemented by processor 702, memory 704, and transceiver 706, as described above with respect to FIG. 7. Besides the on-chip memory (also known as "internal memory," e.g., registers, buffers, or caches) on each chip 202, 204, or 206, apparatus 200 may further include an external memory 208 (e.g., the system memory or main memory) that can be shared by each chip 202, 204, or 206 through the system/main bus. Although baseband chip 202 is illustrated as a standalone SoC in FIG. 2, it is understood that in one example, baseband chip 202 and RF chip 204 may be integrated as one SoC; in another example, baseband chip 202 and host chip 206 may be integrated as one SoC; in still another example, baseband chip 202, RF chip 204, and host chip 206 may be integrated as one SoC, as described above.

In the uplink, host chip 206 may generate raw data and send it to baseband chip 202 for encoding, modulation, and mapping. Baseband chip 202 may also access the raw data generated by host chip 206 and stored in external memory 208, for example, using the direct memory access (DMA). Baseband chip 202 may first encode (e.g., by source coding and/or channel coding) the raw data and modulate the coded data using any suitable modulation techniques, such as multi-phase pre-shared key (MPSK) modulation or quadrature amplitude modulation (QAM). Baseband chip 202 may perform any other functions, such as symbol or layer mapping, to convert the raw data into a signal that can be used to modulate the carrier frequency for transmission. In the uplink, baseband chip 202 may send the modulated signal to RF chip 204. RF chip 204, through the transmitter (Tx), may convert the modulated signal in the digital form into analog signals, i.e., RF signals, and perform any suitable front-end RF functions, such as filtering, up-conversion, or sample-rate conversion. Antenna 210 (e.g., an antenna array) may transmit the RF signals provided by the transmitter of RF chip 204.

In the downlink, antenna 210 may receive RF signals and pass the RF signals to the receiver (Rx) of RF chip 204. RF chip 204 may perform any suitable front-end RF functions, such as filtering, down-conversion, or sample-rate conversion, and convert the RF signals into low-frequency digital signals (baseband signals) that can be processed by baseband chip 202. In the downlink, baseband chip 202 may demodulate and decode the baseband signals to extract raw data that can be processed by host chip 206. Baseband chip 202 may perform additional functions, such as error checking, de-mapping, channel estimation, descrambling, etc. The raw data provided by baseband chip 202 may be sent to host chip 206 directly or stored in external memory 208.

In certain implementations, baseband chip 202 may perform operations associated with the recursive QR+tree search described below, e.g., in connection with FIGS. 3-7. The operations may be performed by one or more functional blocks of the baseband chip 202. For example, although not illustrated in FIG. 2, the baseband chip 202 may include, e.g., one or more layer ordering components configured to order the transmission layers based on received signal strength, one or more QR decomposition units configured to perform a QR decomposition of the channel matrix, one or more subset selection units configured to select a subset of constellation points to be searched, one or more tree search units configured to determine a path metric based at least in part on the subset of constellation points, one or more anchor point selection units configured to select the anchor point used in the subsequent tree search of another transmission layer, and/or an LLR unit configured to determine an LLR based on the path metrics determined from each of the tree searches. Moreover, the anchor point selection unit of one iteration may input information associated with the selected anchor point into the subset selection unit associated with the subsequent iteration.

As a result, compared with known solutions in which the statistics generated for the transmission layers received with higher power are not used in subsequent tree searches, the accuracy of the LLR calculation(s) may be improved while reducing the computational complexity. Additional details of the recursive QR+tree search of the present disclosure is described below in connection with FIGS. 3-7.

Figure 3:
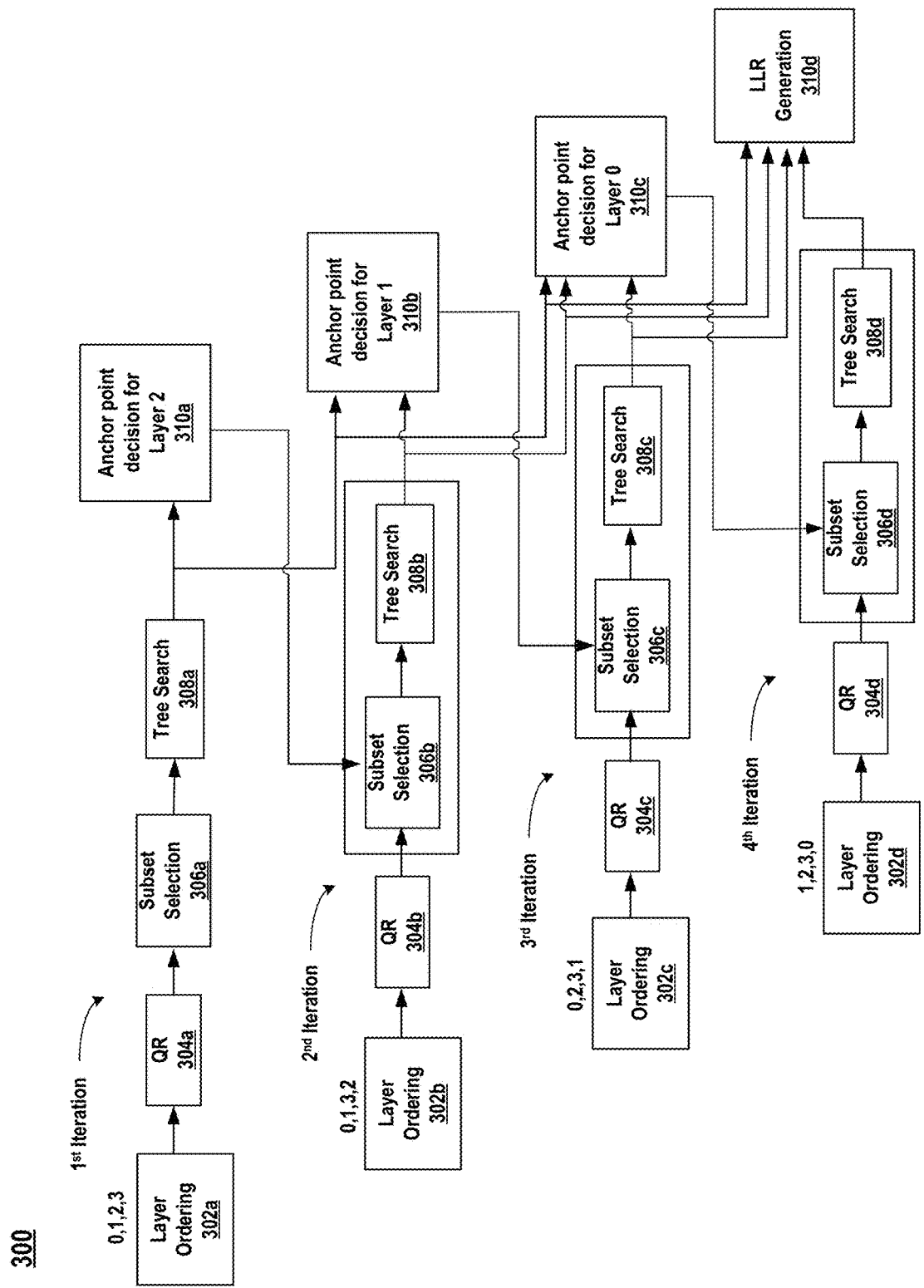
FIG. 3 illustrates a block diagram of a first exemplary baseband chip, according to some embodiments of the present disclosure.

FIG. 3 illustrates a block diagram of a first exemplary baseband chip 300, according to some embodiments of the present disclosure. Baseband chip 300 may be of a node, either UE 102 or access node 104, that is equipped with multiple antennas and configured for MIMO wireless communication. In an example embodiment, the functional units described below may be part of a MIMO detector and/or MIMO demapper that is part of the baseband chip 300. Although baseband chip 300 will be described in connection with a 4×4 MIMO system, the recursive QR+tree search described below may be used for a system with a different number of receiver antennas and/or data streams depending on the number of bits transmitted per symbol without departing from the scope of the present disclosure.

Referring to FIG. 3, baseband chip 300 may include various functional units configured to perform various iterations of the recursive QR+tree search such that the path metrics and/or the detected paths for one iteration may be used for anchor point and subset selection for the bottom layer in the subsequent iteration. In the first iteration, the transmission layers may be ordered from top-to-bottom in order of ascending power.

For example, layer-0 may be received with the lowest signal power, layer-1 may be received with the next highest signal power, layer-2 may be received with the next highest signal power, and layer-3 may be received with the highest signal power. In the first iteration, the top-to-bottom first ordering may be, e.g., layer-0, layer-1, layer-2, layer-3. In the second iteration, the top-to-bottom second ordering may be, e.g., layer-0, layer-1, layer-3, layer-2. In the third iteration, the top-to-bottom third ordering may be, e.g., layer-0, layer-2, layer-3, layer-1. In the fourth iteration, the top-to-bottom fourth ordering may be, e.g., layer-1, layer-2, layer-3, layer-0.

In certain implementations, each iteration may include a dedicated set of functional blocks. The functional blocks may include, without limitation, a layer ordering unit 302a, 302b, 302c, 302d, a QR decomposition unit 304a, 304b, 304c, 304d, a subset selection unit 306a, 306b, 306c, 306d, a tree search unit 308a, 308b, 308c, 308d, and a path metric unit 310a, 310b, 310c. The last iteration may include an LLR unit 310d configured to generate an LLR associated with an estimated QAM symbol.

To begin, baseband chip 300 may perform QAM slicing to select an anchor point from the constellation associated with layer-3. Because layer-3 has the highest signal strength, anchor point selection using QAM slicing will incur a smaller amount of ambiguity as compared to QAM slicing of layer-2, layer-1, and layer-0.

The recursive QR+tree search may begin with the first iteration. Here, the first layer ordering unit 302a may order each of the transmission layers in order of ascending signal strength. The signal strength of the transmission layers may be determined based at least in part on a signal characteristic corresponding to the received signal power. By way of example and not limitation, the signal characteristic may include one or more of signal-to-noise ratio (SNR), signal-to-interference-plus-noise ratio (SINR), received signal strength indication (RSSI), just to name a few. In certain implementations, the first layer ordering unit 302a may determine the signal strength for each of the transmission layers. However, in certain other implementations, the signal strength may be determined by a functional unit not shown in FIG. 3. In such an implementation, information associated with the signal strength for each of the transmission layers may be input into first layer ordering unit 302a. In either implementation, the first layer ordering unit 302a may generate a first complex channel matrix $H_1 \in \mathbb{C}^{M \times N}$ based at least in part on the first ordering of the transmission layers.

The first complex channel matrix $H_1$ may be input into the first QR decomposition unit 304a. The first QR decomposition unit 304a may perform a QR decomposition of the first complex channel matrix $H_1$ to generate a first estimated channel matrix $\hat{H}_1$, which may be input into the first subset selection unit 306a. In the meantime, $\hat{Y}(=Q^{-1}Y)$ can also be generated as a byproduct of QR decomposition.

First subset selection unit 306a may select a subset of constellation points around the layer-3 anchor point. The subset of constellation points may be selected based on predetermined criteria. In certain other implementations, the subset of constellation points may be selected based on a square box around the anchor point. In another implementation, the subset of constellation points may be selected based on the distance from the anchor point. The size of the subset may be determined based on, for example, the SINR, RSSI, etc.

Information associated with the layer-3 anchor point, the subset of constellation points in layer-3, $\hat{H}_1$ as well as the received signal $\hat{Y}(=Q^{-1}Y)$, may be input into the first tree search unit 308a. First tree search unit 308a may generate a first search tree based on the first ordering of transmission layers. Using the first search tree, first tree search unit 308a may perform a tree search to determine various path metrics.

For example, the search tree (also referred to as "decoding tree" or "logic tree") is a lattice structure representing constellation points of the received signal corresponding to a constellation, e.g., such as a 16 QAM. The lattice structure comprises a plurality of nodes, each node comprises an integer value representing a component of a symbol of the received data signal. In certain implementations, the received data signal may be represented according to a real-valued or complex-value representation. As used herein, the term "node" is used to designate a component of a symbol of the received data signal.

The first node of the search tree is referred to as the "root node." A node that does not have any child node (a child node is also referred to as "successor") is referred to as a "leaf" node and corresponds to the lowest level in the search tree. The root node, being the highest node in the search tree, does not have a parent node. The depth (or dimension) of a given node designates the length of the path from this given node up to the root node in the search tree. All the nodes of the search tree can be reached from the root node. Each path from the root node to a leaf node thus represents a possible transmitted signal. Nodes in the search tree represent the different possible values of the symbols $s_i$, where $s_i$, with i representing an integer ranging from n to 1, represent the real and imaginary components of the transmitted information vector. A leaf node designates a node in depth n. According to the notations used herein, the child nodes of a node $s_k$ are designated by the components $s_{k-1}$ and a path of depth i in the search tree is designated by the vector $s^{(i)}=(s_n, s_{n-1}, \ldots, s_i)$ of length (n–i+1).

A sequential decoding algorithm is a tree-search based decoding algorithm which is based on a tree representation of the ML optimization problem (represented by the search tree). Such sequential decoding algorithm uses a stack or a list to store the best candidate nodes. Sequential decoding techniques consider a path metric for each expanded node of the search tree. Each node selected among the expanded nodes (component of a candidate lattice point) is stored in the stack in association with the computed path metric. The path metric is generally determined as a function of the Euclidean distance between the signal received and the symbols vector represented by the path metric between the root node and the current node. However, the path metric may be determined using a different function without departing from the scope of the present disclosure.

The various path metrics determined by the first tree search unit 308a may be input into the first path metric unit 310a. First path metric unit 310a may select the path metric with the smallest Euclidean distance as the path metric that is input into LLR unit 310d for layer-3.

First path metric unit 310a may select the layer-2 anchor point used in the second iteration. In certain implementations, the layer-2 anchor point may be selected based at least in part on, e.g., the various path metrics and/or the paths input by the first tree search unit 308a, for example, select the layer-2 node in the best path as the anchor point. Information associated with the layer-2 anchor point may be input into the second subset selection unit 306b. Because the signal power associated with layer-3 is higher than that of layer-2, selecting the layer-2 anchor point using the path metrics and/or the paths in the first iteration may increase the accuracy of the path metrics determined in the second iteration.

In the second iteration, the second layer ordering unit 302b may generate a second complex channel matrix $H_2$ based on the second ordering in which layers 3 and 2 are transposed as compared to the ordering in the first iteration. Namely, in the second iteration, layer-2 is the bottom layer, and layer-3 is the second lowest layer. In certain implementations, the second layer ordering unit 302b may determine the signal strengths of the various transmission layers. In certain other implementations, the first layer order unit 302a may input information associated with the signal power of the various transmission layers into the other layer ordering units 302b, 302c, 302d.

With respect to the second iteration, second layer ordering unit 302b may generate a second complex channel matrix $H_2 \in \mathbb{C}^{M \times N}$ based at least in part on the second ordering of the transmission layers.

Second complex channel matrix $H_2$ may be input into the second QR decomposition unit 304b. The second QR decomposition unit 304b may perform a QR decomposition of the second complex channel matrix $H_2$ to generate a second estimated channel matrix $\hat{H}_2$, as well as the received signal $\hat{Y}(=Q^{-1}Y)$, which may be input into the second subset selection unit 306b.

Second subset selection unit 306b may select a subset of constellation points around the layer-2 anchor point. The subset of constellation points may be selected using the same or similar operations described above in connection with those selected for the layer-3 anchor point.

Information associated with the layer-2 anchor point, the subset of constellation points selected for layer-2, $\hat{H}_2$ and $\hat{Y}$ may be input into the second tree search unit 308b. Second tree search unit 308b may generate a second search tree based on the second ordering of transmission layers. Using the second search tree, second tree search unit 308b may perform a tree search to determine various path metrics associated with the layer-2 anchor point.

The second iteration may conclude with the second path metric unit 310b selecting the best path metric and associated path based on the second ordering. The path metric of the second ordering may be input into LLR unit 310d. Moreover, second path metric unit 310b may select a layer-1 anchor point. Information associated with the layer-1 anchor point may be input into the third subset selection unit 306c for use in selecting a subset of constellation points based on the third ordering.

The various path metrics determined by second tree search unit 308b may be input into the second path metric unit 310b. Second path metric unit 310b may select the path metric with the smallest Euclidean distance as the path metric that is input into LLR unit 310d for layer-2.

Second path metric unit 310b may select the layer-1 anchor point used in the third iteration. In certain implementations, the layer-1 anchor point may be selected based at least in part on, e.g., the various path metrics and the paths input by second tree search unit 308b. For example, in certain implementations, the layer-1 node in the best path may be selected as the anchor point. In another implementation, the layer-1 anchor point may be selected based at least in part on, e.g., the various path metrics input by the first tree search unit 308a and the second tree search unit 308b. Here, the layer-1 node in the best path in the previous two iterations may be selected as the anchor point. Information associated with the layer-1 anchor point may be input into the third subset selection unit 306c. Because the signal power associated with layer-2 is higher than that of layer-1, selecting the layer-1 anchor point using the path metrics in the second iteration may increase the accuracy of the path metrics determined in the third iteration.

Each of the functional units associated with the third and fourth iterations may perform operations that are the same or similar to those described above in connection with the first and second iterations. Thus, in the interest of conciseness, descriptions of these operations performed by the functional blocks associated with the third and fourth iterations will not be reiterated.

After performing each of the four iterations, LLR unit 310d may generate LLRs associated with one or more QAM symbols associated with each layer. Using these techniques described in connection with FIG. 3, as compared with known solutions in which the statistics generated for the transmission layers received with a higher power are not used in subsequent tree searches for the transmission layers received with lower power, the accuracy of the LLR calculation(s) performed by LLR unit 310d may be increased while still providing reduced computational complexity.

Figure 4:
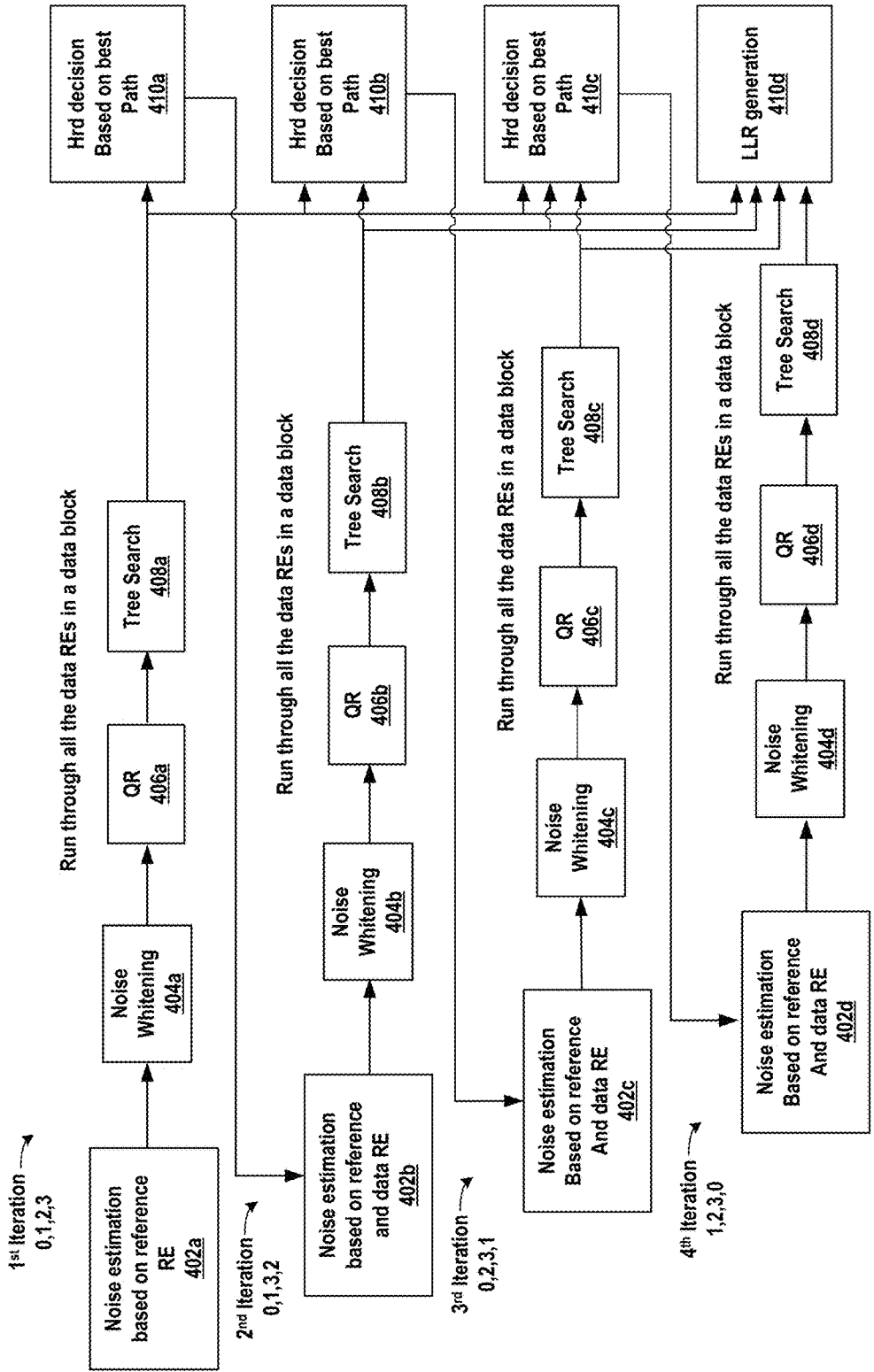
FIG. 4 illustrates a block diagram of a second exemplary baseband chip, according to some embodiments of the present disclosure.

FIG. 4 illustrates a block diagram of a second exemplary baseband chip 400, in accordance with some embodiments of the present disclosure. Baseband chip 400 may be of a node, either UE 102 or access node 104, that is equipped with multiple antennas and configured for MIMO wireless communication. In an example embodiment, the functional units described below may be part of a MIMO detector and/or MIMO demapper that is part of the baseband chip 400. Although baseband chip 400 will be described in connection with a 4×4 MIMO system, the recursive QR+tree search described below may be used for a system with a different number of receiver antennas and/or data streams depending on the number of bits transmitted per symbol without departing from the scope of the present disclosure.

Referring to FIG. 4, baseband chip 400 may include various functional units configured to perform various iterations of the recursive QR+tree search such that the path metric for the bottom layer in one iteration may be used for anchor point and subset selection for the bottom layer in the subsequent iteration. In the first iteration, the transmission layers may be ordered from top-to-bottom in order of ascending power.

For example, layer-0 may be received with the lowest signal power, layer-1 may be received with the next highest signal power, layer-2 may be received with the next highest signal power, and layer-3 may be received with the highest signal power. In the first iteration, the top-to-bottom first ordering may be, e.g., layer-0, layer-1, layer-2, layer-3. In the second iteration, the top-to-bottom second ordering may be, e.g., layer-0, layer-1, layer-3, layer-2. In the third iteration, the top-to-bottom third ordering may be, e.g., layer-0, layer-2, layer-3, layer-1. In the fourth iteration, the top-to-bottom fourth ordering may be, e.g., layer-1, layer-2, layer-3, layer-0.

In certain implementations, each iteration may include a dedicated set of functional blocks. The functional blocks may include, without limitation, a noise estimation unit 402a, 402b, 402c, 402d, a noise whitening unit 404a, 404b, 404c, 404d, a QR decomposition unit 406a, 406b, 406c, 406d, a tree search unit 408a, 408b, 408c, 408d, and a path metric unit 410a, 410b, 410c. The last iteration may include an LLR unit 410d configured to generate an LLR associated with an estimated data RE. In FIG. 4, layer ordering may be determined using the same or similar techniques as those described above in connection with FIG. 3.

The recursive QR+tree search in FIG. 4 may begin with the first iteration. Here, the first noise estimation unit 402a may use reference REs in layer-3 to perform first noise estimation. Noise estimation based on reference REs may be performed using any technique known in the art without departing from the scope of the present disclosure. Information associated with the first noise estimation may be input into the first noise whitening unit 404a.

First noise whitening unit 404a may perform noise whitening of the channel matrix of the first ordering and received signal based at least in part on the first noise estimation. A whitening transformation is a linear transformation that transforms the noise vector with a known covariance matrix into a set of new variables whose covariance is the identity matrix. Namely, the set of new variables are uncorrelated, and each have variance 1. The transformation is called "whitening" because it changes the input noise into a white noise vector.

For example, suppose X is a random noise vector with non-singular covariance matrix $\Sigma$ and mean 0. Then, the transformation Y=WX with a whitening matrix W satisfying the condition $W^H W = \Sigma^{-1}$ yields the whitened random vector Y with unit diagonal covariance.

The output of the first noise whitening unit 404a may be first complex channel matrix $H_1$ associated with the first ordering of transmission layers and whitened received signal Y. First complex channel matrix $H_1$ and Y may be input into first QR decomposition unit 406a. First QR decomposition unit 406a may perform a QR decomposition of the first complex channel matrix $H_1$ to generate a first estimated channel matrix $\hat{H}_1$ and the received signal $\hat{Y}(=Q^{-1}Y)$, which may be input into the first tree search unit 408a.

First tree search unit 408a may generate a first search tree based on the first estimated channel matrix $\hat{H}_1$ and the received signal $\hat{Y}(=Q^{-1}Y)$. Using the first search tree, first tree search unit 408a may perform a tree search to determine various paths associated with path metrics, which may be input into first path metric unit 410a. First path metric unit 410a may select the best path, which has the least path metric. The best path selected by first path metric unit 410a may be associated with an estimated data RE in the resource block (RB) (also referred to as a "data block"). First path metric unit 410a may use any hard-decision technique known in the art to estimate the data symbol in each layer. Then, the estimated data RE is reconstructed based on the estimated data symbol in each layer and the estimated channel Information associated with the path metric selected by first path metric unit 410a may be input into LLR unit 410d.

The techniques described above in connection with the first iteration may be performed for each data RE in the data block received in layer-3. Then, first path metric unit 410a may input information associated with each of estimated data REs into second noise estimation unit 402b. In the context of spatial multiplexing, each RE may include four layers of data. More specifically, in the tree search diagram, each path contains four nodes and each node may correspond to one symbol (e.g., constellation point) in a single layer.

In the second iteration, second noise estimation unit 402b may perform noise estimation for the channel based at least in part on the reference REs and the estimated data REs input by first path metric unit 410a. By using the estimated data REs as well as the sparse reference REs, the noise estimated by second noise estimation unit 402b may have an increased accuracy as compared to conventional systems that rely on only reference REs for noise estimation. Information associated with the second noise estimation may be input into the second noise whitening unit 404b.

Second noise whitening unit 404b may perform noise whitening of the channel matrix of the second ordering based at least in part on the second noise estimation as well as the received signal. Additional details of noise whitening are provided above in connection with first noise whitening unit 404a.

The output of second noise whitening unit 404b may be a second complex channel matrix $H_2$ associated with the second ordering of transmission layers and whitened received signal Y. Second complex channel matrix $H_2$ and Y may be input into second QR decomposition unit 406b. Second QR decomposition unit 406b may perform a QR decomposition of the second complex channel matrix $H_2$ to generate a second estimated channel matrix $\hat{H}_2$ as well as the received signal $\hat{Y}(=Q^{-1}Y)$, which may be input into the second tree search unit 408b.

Second tree search unit 408b may generate a second search tree based on the second estimated channel matrix $\hat{H}_2$. Using the second search tree, second tree search unit 408b may perform a tree search to determine various paths and associated path metrics, which may be input into second path metric unit 410b. Second path metric unit 410b may select the best path from the detected path from tree search block 408a and 408b with the best path metric. The path selected by second path metric unit 410b may be associated with an estimated data RE in the RB. Or in the other word, the estimated data RE can be reconstructed by the data symbols in each layer according to the best path and the estimated channel. Information associated with the path selected by second path metric unit 410b may be input into LLR unit 410d.

The techniques described above in connection with the second iteration may be performed for each data RE in the data block received in layer-2. Then, second path metric unit 410b may input information associated with each of estimated data REs into third noise estimation unit 402c.

Each of the functional units associated with the third and fourth iterations may perform operations that are the same or similar to those described above in connection with the first and second iterations. Thus, in the interest of conciseness, descriptions of these operations performed by the functional blocks associated with the third and fourth iterations will not be reiterated.

After performing each of the four iterations, LLR unit 410d may generate LLRs for the data REs. Using the consecutive iterations described in connection with FIG. 4, baseband chip 400 takes advantage of the estimated data REs in previous iterations to improve the noise/interference estimation as conventional techniques that only use the sparse reference REs to perform noise estimation.

Figure 5:
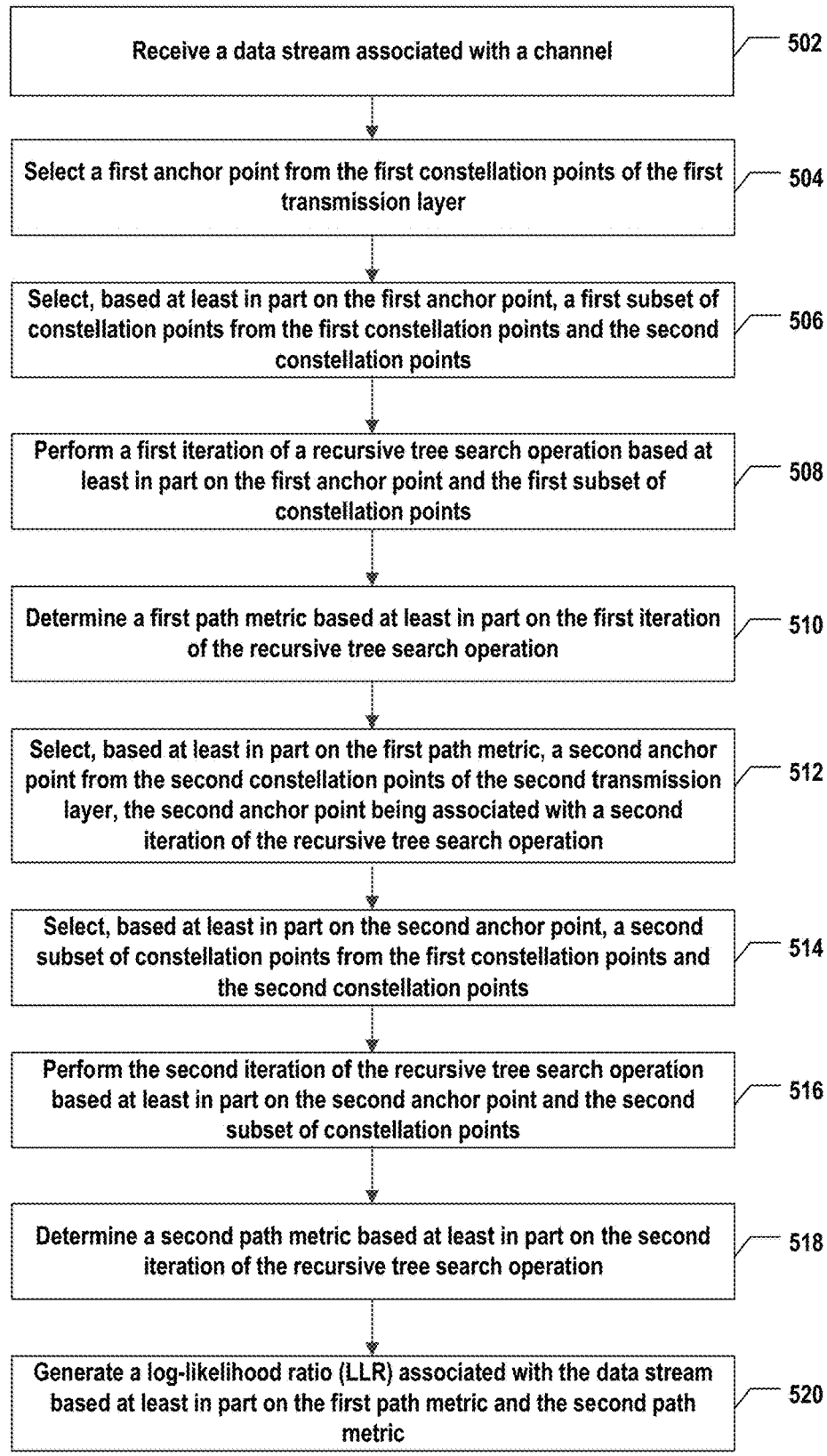
FIG. 5 illustrates a flow chart of a first exemplary method for recursive tree search-based MIMO detection data processing, according to some embodiments of the present disclosure.

FIG. 5 illustrates a flow chart of a first exemplary method 500 for wireless communication, according to some embodiments of the present disclosure. Examples of the apparatus that can perform operations of method 500 include, for example, baseband chip 300 depicted in FIG. 3 or any other suitable apparatus disclosed herein. It is understood that the operations shown in method 500 are not exhaustive and that other operations can be performed as well before, after, or between any of the illustrated operations. Further, some of the operations may be performed simultaneously, or in a different order than shown in FIG. 5.

Referring to FIG. 5, at 502, the baseband chip may receive a data stream associated with a channel. In certain aspects, the channel may include a plurality of transmission layers (e.g., layer-3, layer-2, layer-1, layer-0). In certain other aspects, the plurality of transmission layers may include a first transmission layer (e.g., layer-3) associated with first constellation points and a second transmission layer (e.g., layer-2) associated with second constellation points. For example, referring to FIG. 3, baseband chip 300 may be configured for MIMO wireless communication and may receive bit streams in multiple transmission layers, e.g., layer-3, layer-2, layer-1, layer-0, etc. Each of the bit streams may include one or more QAM symbols.

At 504, the baseband chip may select a first anchor point from the first constellation points of the first transmission layer. For example, referring to FIG. 3, baseband chip 300 may perform QAM slicing to select an anchor point from the constellation associated with layer-3. Because layer-3 has the highest signal strength, anchor point selection using QAM slicing will incur a smaller amount of ambiguity as compared to QAM slicing of layer-2, layer-1, and layer-0.

At 506, the baseband chip may select, based at least in part on the first anchor point, a first subset of constellation points from the first constellation points and the second constellation points. For example, referring to FIG. 3, first subset selection unit 306a may select a subset of constellation points around the layer-3 anchor point. The subset of constellation points may be selected based on predetermined criteria. In certain other implementations, the subset of constellation points may be selected based on a square box around the anchor point. In another implementation, the subset of constellation points may be selected based on the distance from the anchor point. The size of the subset may be determined based on, for example, the RSSI, SINR, etc.

At 508, the baseband chip may perform a first iteration of a recursive tree search operation based at least in part on the first subset of constellation points associated with the first anchor point. For example, referring to FIG. 3, the recursive QR+tree search may begin with the first iteration. Here, the first layer ordering unit 302a may order each of the transmission layers in order of ascending signal strength. The signal strength of the transmission layers may be determined based at least in part on a signal characteristic corresponding to the received signal power. The first layer ordering unit 302a may generate a first complex channel matrix $H_1 \in \mathbb{C}^{M \times N}$ based at least in part on the first ordering of the transmission layers. The first complex channel matrix $H_1$ may be input into the first QR decomposition unit 304a. The first QR decomposition unit 304a may perform a QR decomposition of the first complex channel matrix $H_1$ to generate a first estimated channel matrix $\hat{H}_1$ as well as the received signal $\hat{Y}(=Q^{-1}Y)$, which may be input into the first subset selection unit 306a. First subset selection unit 306a may select a subset of constellation points around the layer-3 anchor point. The subset of constellation points may be selected based on predetermined criteria. In certain other implementations, the subset of constellation points may be selected based on a square box around the anchor point. In another implementation, the subset of constellation points may be selected based on the distance from the anchor point. Information associate with the layer-3 anchor point, the subset of constellation points in layer-3, $\hat{H}_1$ and the received signal $\hat{Y}$, may be input into the first tree search unit 308a. First tree search unit 308a may generate a first search tree based on the first ordering of transmission layers. Using the first search tree, first tree search unit 308a may perform a tree search to determine various paths and associated path metrics.

At 510, the baseband chip may determine a first path based at least in part on the first iteration of the recursive tree search operation. For example, referring to FIG. 3, the various paths and associated path metrics determined by the first tree search unit 308a may be input into the first path metric unit 310a. First path metric unit 310a may select the best path based on the path metrics.

At 512, the baseband chip may select, based at least in part on the first path metric, a second anchor point from the second constellation points of the second transmission layer. In certain aspects, the second anchor point may be associated with a second iteration of the recursive tree search operation. For example, referring to FIG. 3, first path metric unit 310a may select the layer-2 anchor point used in the second iteration. In certain implementations, the layer-2 anchor point may be selected based at least in part on, e.g., the various path metrics input by the first tree search unit 308a. For example, select the layer-2 node in the best path in the first iteration as the anchor point. Information associated with the layer-2 anchor point may be input into the second subset selection unit 306b. Because the signal power associated with layer-3 is higher than that of layer-2, selecting the layer-2 anchor point using the path metrics in the first iteration may increase the accuracy of the path metrics determined in the second iteration.

At 514, the baseband chip may select, based at least in part on the second anchor point, a second subset of constellation points from the second constellation for layer-2. For example, referring to FIG. 3, second subset selection unit 306b may select a subset of constellation points around the layer-2 anchor point. The subset of constellation points may be selected using the same or similar operations described above in connection with those selected for the layer-3 anchor point.

At 516, the baseband chip may perform the second iteration of the recursive tree search operation based at least in part on the second subset of constellation points. For example, referring to FIG. 3, information associated with the subset of constellation points selected for layer-2, $\hat{H}_2$ and the received signal $\hat{Y}$, may be input into the second tree search unit 308b. Second tree search unit 308b may generate a second search tree based on the second ordering of transmission layers. Using the second search tree, second tree search unit 308b may perform a tree search to determine various paths and associated path metrics.

At 518, the baseband chip may determine a second path metric based at least in part on the second iteration of the recursive tree search operation. For example, referring to FIG. 3, the second iteration may conclude with the second path metric unit 310b selecting the best path metric based on the second ordering. The path metric of the second ordering may be input into LLR unit 310d.

At 520, the baseband chip may generate an LLR associated with the data stream based at least in part on the first path metric and the second path metric. For example, referring to FIG. 3, after performing each of the four iterations, LLR unit 310d may generate LLRs associated with one or more QAM symbols associated with each layer.

Figure 6:
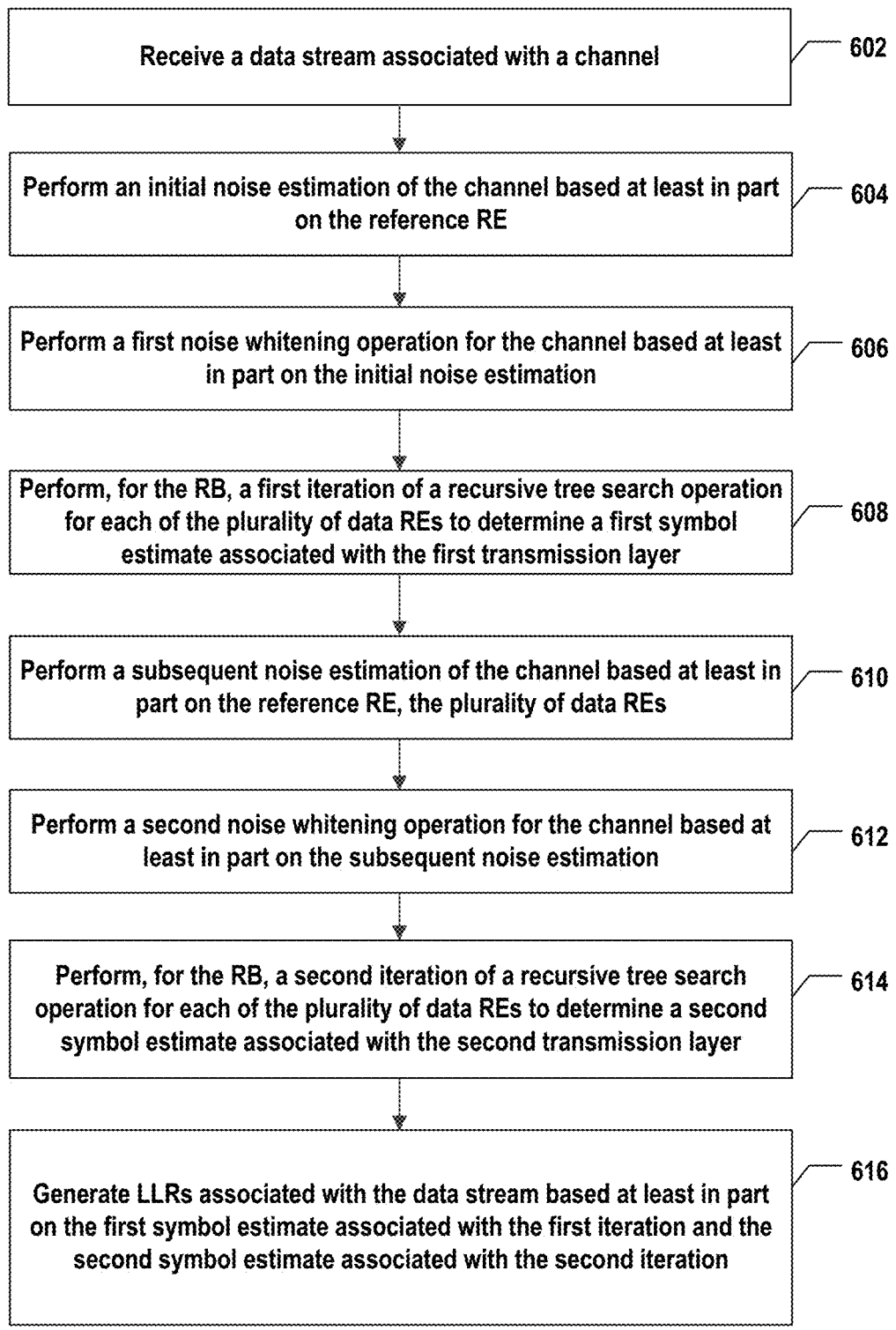
FIG. 6 illustrates a flow chart of a second exemplary method for recursive tree search-based MIMO detection data processing, according to some embodiments of the present disclosure.

FIG. 6 illustrates a flow chart of a second exemplary method 600 for wireless communication, according to some embodiments of the present disclosure. Examples of the apparatus that can perform operations of method 600 include, for example, baseband chip 400 depicted in FIG. 4 or any other suitable apparatus disclosed herein. It is understood that the operations shown in method 600 are not exhaustive and that other operations can be performed as well before, after, or between any of the illustrated operations. Further, some of the operations may be performed simultaneously, or in a different order than shown in FIG. 6.

Referring to FIG. 6, at 602, the baseband chip may receive a data stream associated with a channel. In certain aspects, the channel may include a plurality of transmission layers. In certain other aspects, the plurality of transmission layers may include a first transmission layer and a second transmission layer associated with a resource block (RB). In certain other aspects, the RB may include at least one first reference RE and a plurality of first data resource elements (REs). For example, referring to FIG. 4, baseband chip 400 may receive a data stream that includes different resource blocks with different REs received via different transmission layers in the channel.

At 604, the baseband chip may perform an initial noise estimation of the channel based at least in part on the reference RE. For example, referring to FIG. 4, the first noise estimation unit 402a may use reference REs in layer-3 to perform the first noise estimation. Noise estimation based on reference REs may be performed using any technique known in the art without departing from the scope of the present disclosure. Information associated with the first noise estimation may be input into the first noise whitening unit 404a.

At 606, the baseband chip may perform a first noise whitening operation for the channel and received signal based at least in part on the initial noise estimation. For example, referring to FIG. 4, first noise whitening unit 404a may perform noise whitening of the channel matrix of the first ordering based at least in part on the first noise estimation. A whitening transformation is a linear transformation that transforms a vector of random variables with a known covariance matrix into a set of new variables whose covariance is the identity matrix. Namely, the set of new variables are uncorrelated, and each have variance 1. The transformation is called "whitening" because it changes the input vector into a white noise vector. For example, suppose X is a random noise vector with non-singular covariance matrix $\Sigma$ and mean 0. Then, the transformation Y=WX with a whitening matrix W satisfying the condition $W^H W = \Sigma^{-1}$ yields the whitened random noise vector Y with unit diagonal covariance. The output of the first noise whitening unit 404a may be first complex channel matrix $H_1$ associated with the first ordering of transmission layers, and the received signal Y. First complex channel matrix $H_1$ and Y may be input into first QR decomposition unit 406a. First QR decomposition unit 406a may perform a QR decomposition of the first complex channel matrix $H_1$ to generate a first estimated channel matrix $\hat{H}_1$ and $\hat{Y}$ which may be input into the first tree search unit 408a.

At 608, the baseband chip may perform, for the first RB, a first iteration of a recursive tree search operation (e.g., QR, tree search, path metric selection, etc.) for each of the plurality of first data REs to determine a first symbol estimate associated with the first transmission layer. For example, referring to FIG. 4, first complex channel matrix $H_1$ may be input into first QR decomposition unit 406a. First QR decomposition unit 406a may perform a QR decomposition of the first complex channel matrix $H_1$ to generate a first estimated channel matrix $\hat{H}_1$ and $\hat{Y}(=Q^{-1}Y)$, which may be input into the first tree search unit 408a. First tree search unit 408a may generate a first search tree based on the first estimated channel matrix $\hat{H}_1$. Using the first search tree, first tree search unit 408a may perform a tree search to determine various paths and associated path metrics, which may be input into first path metric unit 410a. The techniques described above in connection with the first iteration may be performed for each data RE in the data block received in layer-3. Then, first path metric unit 410a may input information associated with each of estimated data REs received across all of the layers into second noise estimation unit 402b. First path metric unit 410a may select the path with the best path metric. The path selected by first path metric unit 410a may be associated with an estimated data RE in the data block. First path metric unit 410a may use any hard-decision technique known in the art to estimate the data RE(s).

At 610, the baseband chip may perform a subsequent noise estimation of the channel based at least in part on the reference RE, the plurality of data REs, which are estimated in the first iteration. For example, referring to FIG. 4, second noise estimation unit 402b may perform noise estimation for the channel based at least in part on the reference REs and the estimated data REs input by first path metric unit 410a. By using the estimated data REs as well as the sparse reference REs, the noise estimated by second noise estimation unit 402b may have an increased accuracy as compared to conventional systems that rely on only reference REs for noise estimation. Information associated with the second noise estimation may be input into the second noise whitening unit 404b.

At 612, the baseband chip may perform a second noise whitening operation for the channel based at least in part on the subsequent noise estimation. For example, referring to FIG. 4, information associated with the second noise estimation may be input into the second noise whitening unit 404b. Second noise whitening unit 404b may perform noise whitening of the channel matrix of the second ordering and the received signal based at least in part on the second noise estimation. Additional details of noise whitening are provided above in connection with first noise whitening unit 404a. The output of second noise whitening unit 404b may be a second complex channel matrix $H_2$ associated with the second ordering of transmission layers. Second complex channel matrix $H_2$ may be input into second QR decomposition unit 406b.

At 614, the baseband chip may perform, for the first RB, a second iteration of a recursive tree search operation (e.g., QR, tree search, path metric selection, etc.) for each of the plurality of data REs to determine a second symbol estimate. For example, referring to FIG. 4, second QR decomposition unit 406b may perform a QR decomposition of the second complex channel matrix $H_2$ to generate a second estimated channel matrix $\hat{H}_2$ and $\hat{Y}(=Q^{-1}Y)$, which may be input into the second tree search unit 408b. Second tree search unit 408b may generate a second search tree based on the second estimated channel matrix $\hat{H}_2$. Using the second search tree, second tree search unit 408b may perform a tree search to determine various paths and associated path metrics, which may be input into second path metric unit 410a. Second path metric unit 410b may select the path with the best path metric. The path selected by second path metric unit 410b may be associated with an estimated data RE in the data block.

At 616, the baseband chip may generate LLRs associated with the data stream based at least in part on the first symbol estimate associated with the first transmission layer and the second symbol estimate associated with the second transmission layer. For example, referring to FIG. 4, after performing each of the four iterations, LLR unit 410d may generate LLRs for one or more data REs. Using the consecutive iterations described in connection with FIG. 4, baseband chip 400 takes advantage of the estimated data REs in previous iterations to improve the noise/interference estimation as conventional techniques that only use the sparse reference REs to perform noise estimation.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 700 in FIG. 7. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to another aspect of the present disclosure, a baseband chip including a memory and at least one processor coupled to the memory is configured to perform various operations. In some embodiments, the at least one processor is configured to receive a data stream associated with a channel. In certain aspects, the channel including a plurality of transmission layers. In certain other aspects, the plurality of transmission layers may include a first transmission layer associated with first constellation points and a second transmission layer associated with second constellation points. In some other embodiments, the at least one processor may be configured to select a first anchor point from the first constellation points of the first transmission layer. In some other embodiments, the at least one processor may be configured to select, based at least in part on the first anchor point, a first subset of constellation points from the first constellation points and the second constellation points. In some other embodiments, the at least one processor may be configured to perform a first iteration of a recursive tree search operation based at least in part on the first anchor point and the first subset of constellation points. In some other embodiments, the at least one processor may be configured to determine a first path metric based at least in part on the first iteration of the recursive tree search operation. In some other embodiments, the at least one processor may be configured to select, based at least in part on the first path metric, a second anchor point from the second constellation points of the second transmission layer. In certain aspects, the second anchor point may be associated with a second iteration of the recursive tree search operation.

In some embodiments, the at least one processor may be further configured to select, based at least in part on the second anchor point, a second subset of constellation points from the first constellation points and the second constellation points. In some other embodiments, the at least one processor may be further configured to perform the second iteration of the recursive tree search operation based at least in part on the second anchor point and the second subset of constellation points. In some other embodiments, the at least one processor may be further configured to determine a second path metric based at least in part on the second iteration of the recursive tree search operation.

In some embodiments, the at least one processor may be further configured to generate an LLR associated with the data stream based at least in part on the first path metric and the second path metric.

In some embodiments, the at least one processor may be configured to perform the first iteration of the recursive tree search by performing a first ordering of the plurality of transmission layers, the first transmission layer being a bottom layer in the first ordering. In some embodiments, the at least one processor may be configured to perform the first iteration of the recursive tree search by generating a first channel matrix based at least in part on the first ordering of the plurality of transmission layer. In some embodiments, the at least one processor may be configured to perform the first iteration of the recursive tree search by performing a first QR decomposition of the first channel matrix. In some embodiments, the at least one processor may be configured to perform the first iteration of the recursive tree search by perform a first tree search based at least in part on the first QR decomposition, the first anchor point, and the first subset of constellation points.

In certain aspects, the first path metric may be determined as a result of the first tree search.

In some embodiments, the at least one processor may be configured to perform the second iteration of the recursive tree search by performing a second ordering of the plurality of transmission layers. In certain aspects, the second transmission layer may be a bottom layer in the second ordering. In some embodiments, the at least one processor may be configured to perform the second iteration of the recursive tree search by generating a second channel matrix based at least in part on the second ordering of the plurality of transmission layer. In some embodiments, the at least one processor may be configured to perform the second iteration of the recursive tree search by performing a second QR decomposition of the second channel matrix. In some embodiments, the at least one processor may be configured to perform the second iteration of the recursive tree search by performing a second tree search based at least in part on the second QR decomposition, the second anchor point, and the second subset of constellation points.

In certain aspects, the first transmission layer may have a higher power than the second transmission layer.

According to one aspect of the present disclosure, a baseband chip including a memory and at least one processor coupled to the memory is configured to perform various operations. In some embodiments, the at least one processor is configured to receive a data stream associated with a channel. In certain aspects, the channel may include a plurality of transmission layers. In certain other aspects, the plurality of transmission layers may include a first and a second transmission layers associated with a resource block (RB). In certain aspects, the RB may include at least one reference resource element (RE) and a plurality of data REs. In some other embodiments, the at least one processor is configured to perform an initial noise estimation of the channel based at least in part on the reference RE. In some other embodiments, the at least one processor is configured to perform a noise whitening operation for the channel based at least in part on the initial noise estimation. In some other embodiments, the at least one processor is configured to perform, for the first RB, a first iteration of a recursive tree search operation for each of the plurality of first data REs to determine a first symbol estimate associated with the first and the second transmission layers. In some other embodiments, the at least one processor is configured to perform a subsequent noise estimation of the channel based at least in part on the reference RE, the plurality of data REs, and the first symbol estimate with the first iteration.

In some other embodiments, the at least one processor is configured to perform a second noise whitening operation for the channel based at least in part on the subsequent noise estimation. In some other embodiments, the at least one processor is configured to perform, for the RB, a second iteration of a recursive tree search operation for each of the plurality of data REs to determine a second symbol estimate associated with the second transmission layer.

In some other embodiments, the at least one processor is configured to generate LLRs associated with the data stream based at least in part on the first symbol estimate associated with the first iteration and the second symbol estimate associated with the second iteration.

In certain aspects, the first iteration of the recursive tree search operation may include a first QR decomposition and a first tree search associated with the first transmission layer. In certain other aspects, the second iteration of the recursive tree search operation may include a second QR decomposition and a second tree search associated with the second transmission layer.

According to another aspect of the present disclosure, a method is disclosed that may include receiving a data stream associated with a channel. In certain aspects, the channel may include a plurality of transmission layers. In certain other aspects, the plurality of transmission layers may include a first transmission layer associated with first constellation points and a second transmission layer associated with second constellation points. In some other embodiments, the method may include selecting a first anchor point from the first constellation points of the first transmission layer. In some other embodiments, the method may include selecting, based at least in part on the first anchor point, a first subset of constellation points from the first constellation points and the second constellation points. In some other embodiments, the method may include performing a first iteration of a recursive tree search operation based at least in part on the first anchor point and the first subset of constellation points. In some other embodiments, the method may include determining a first path metric based at least in part on the first iteration of the recursive tree search operation. In some other embodiments, the method may include selecting, based at least in part on the first path metric, a second anchor point from the second constellation points of the second transmission layer. The second anchor point is associated with a second iteration of the recursive tree search operation.

In some other embodiments, the method may include selecting, based at least in part on the second anchor point, a second subset of constellation points from the first constellation points and the second constellation points. In some other embodiments, the method may include performing the second iteration of the recursive tree search operation based at least in part on the second anchor point and the second subset of constellation points. In some other embodiments, the method may include determining a second path metric based at least in part on the second iteration of the recursive tree search operation.

In some other embodiments, the method may include generating an LLR associated with the data stream based at least in part on the first path metric and the second path metric.

In some other embodiments, the performing the first iteration of the recursive tree search may include performing a first ordering of the plurality of transmission layers, the first transmission layer being a bottom layer in the first ordering. In some other embodiments, the method may include generating a first channel matrix based at least in part on the first ordering of the plurality of transmission layer. In some other embodiments, the performing the first iteration of the recursive tree search may include performing a first QR decomposition of the first channel matrix. In some other embodiments, the performing the first iteration of the recursive tree search may include performing a first tree search based at least in part on the first QR decomposition, the first anchor point, and the first subset of constellation points.

In some other embodiments, the method may include the first path metric may be determined as a result of the first tree search.

In some other embodiments, the performing the second iteration of the recursive tree search may include performing a second ordering of the plurality of transmission layers, the second transmission layer being a bottom layer in the second ordering. In some other embodiments, the performing the second iteration of the recursive tree search may include generating a second channel matrix based at least in part on the second ordering of the plurality of transmission layer. In some other embodiments, the performing the second iteration of the recursive tree search may include performing a second QR decomposition of the second channel matrix. In some other embodiments, the performing the second iteration of the recursive tree search may include performing a second tree search based at least in part on the second QR decomposition, the second anchor point, and the second subset of constellation points.

According to another aspect of the present disclosure, a method is disclosed that may include receiving a data stream associated with a channel. In certain aspects, the channel may include a plurality of transmission layers. In certain other aspects, the plurality of transmission layers may include a first and a second transmission layers associated with an RB. In certain other aspects, the RB may include at least one reference RE and a plurality of data REs. In some embodiments, the method may further include performing an initial noise estimation of the channel based at least in part on the reference RE. In some embodiments, the method may further include performing a first noise whitening operation for the channel based at least in part on the initial noise estimation. In some embodiments, the method may further include performing, for the RB, a first iteration of a recursive tree search operation for each of the plurality of data REs to determine a first symbol estimate for the first and the second transmission layers. In some embodiments, the method may further include performing a subsequent noise estimation of the channel based at least in part on the reference RE, the plurality of estimated data REs associated with the first iteration.

In some embodiments, the method may further include performing a second noise whitening operation for the channel based at least in part on the subsequent noise estimation. In some embodiments, the method may further include performing, for the RB, a second iteration of a recursive tree search operation for each of the plurality of data REs to determine a second symbol estimate associated with the second transmission layer.

In some embodiments, the method may further include generating LLRs associated with the data stream based at least in part on the first symbol estimate associated with the first transmission layer and the second symbol estimate associated with the second transmission layer.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A baseband chip for wireless communication, comprising:
   a memory; and
   at least one processor coupled to the memory and configured to:
   receive a data stream associated with a channel, the channel including a plurality of transmission layers, and the plurality of transmission layers including a first transmission layer associated with first constellation points and a second transmission layer associated with second constellation points;
   select a first anchor point from the first constellation points of the first transmission layer;
   select, based at least in part on the first anchor point, a first subset of constellation points from the first constellation points and the second constellation points;
   perform a first iteration of a recursive tree search operation based at least in part on the first anchor point and the first subset of constellation points;
   determine a first path metric based at least in part on the first iteration of the recursive tree search operation; and
   select, based at least in part on the first path metric, a second anchor point from the second constellation points of the second transmission layer, the second anchor point being associated with a second iteration of the recursive tree search operation.

2. The baseband chip of claim 1, wherein the at least one processor is further configured to:
   select, based at least in part on the second anchor point, a second subset of constellation points from the first constellation points and the second constellation points;
   perform the second iteration of the recursive tree search operation based at least in part on the second anchor point and the second subset of constellation points; and
   determine a second path metric based at least in part on the second iteration of the recursive tree search operation.

3. The baseband chip of claim 2, wherein the at least one processor is further configured to:
   generate a log-likelihood ratio (LLR) associated with the data stream based at least in part on the first path metric and the second path metric.

4. The baseband chip of claim 1, wherein the at least one processor is configured to perform the first iteration of the recursive tree search operation by:
   performing a first ordering of the plurality of transmission layers, the first transmission layer being a bottom layer in the first ordering;
   generating a first channel matrix based at least in part on the first ordering of the plurality of transmission layers;
   performing a first QR decomposition of the first channel matrix; and
   perform a first tree search based at least in part on the first QR decomposition, the first anchor point, and the first subset of constellation points.

5. The baseband chip of claim 4, wherein the first path metric is determined as a result of the first tree search.

6. The baseband chip of claim 4, wherein the at least one processor is configured to perform the second iteration of the recursive tree search operation by:
   performing a second ordering of the plurality of transmission layers, the second transmission layer being a bottom layer in the second ordering;
   generating a second channel matrix based at least in part on the second ordering of the plurality of transmission layers;
   performing a second QR decomposition of the second channel matrix; and
   performing a second tree search based at least in part on the second QR decomposition, the second anchor point, and the second subset of constellation points.

7. The baseband chip of claim 1, wherein the first transmission layer has a higher power than the second transmission layer.

8. A baseband chip for wireless communication, comprising:
   a memory; and
   at least one processor coupled to the memory and configured to:
   receive a data stream associated with a channel, the channel including a plurality of transmission layers, the plurality of transmission layers including first and second transmission layers associated with a resource block (RB), the RB including at least one reference resource element (RE) and a plurality of data resource elements (REs);
   perform an initial noise estimation of the channel based at least in part on the reference RE;
   perform a first noise whitening operation for the channel based at least in part on the initial noise estimation;
   perform, for the RB, a first iteration of a recursive tree search operation for each of the plurality of data REs to determine a first symbol estimate associated with the first transmission layer; and
   perform a subsequent noise estimation of the channel based at least in part on the reference RE, the plurality of data REs, and the first symbol estimate associated with the first iteration of the recursive tree search.

9. The baseband chip of claim 8, wherein the at least one processor is further configured to:
perform a second noise whitening operation for the channel based at least in part on the subsequent noise estimation; and
perform, for the RB, a second iteration of a recursive tree search operation for each of the plurality of data REs to determine a second symbol estimate associated with the second transmission layer.

10. The baseband chip of claim 9, wherein the at least one processor is further configured to:
generate a log-likelihood ratio (LLR) associated with the data stream based at least in part on the first symbol estimate associated with the first iteration and the second symbol estimate associated with the second iteration.

11. The baseband chip of claim 10, wherein:
the first iteration of the recursive tree search operation includes a first QR decomposition and a first tree search associated with the first transmission layer, and
the second iteration of the recursive tree search operation includes a second QR decomposition and a second tree search associated with the second transmission layer.

12. A method of wireless communication, comprising:
receiving a data stream associated with a channel, the channel including a plurality of transmission layers, and the plurality of transmission layers including a first transmission layer associated with first constellation points and a second transmission layer associated with second constellation points;
selecting a first anchor point from the first constellation points of the first transmission layer;
selecting, based at least in part on the first anchor point, a first subset of constellation points from the first constellation points and the second constellation points;
performing a first iteration of a recursive tree search operation based at least in part on the first anchor point and the first subset of constellation points;
determining a first path metric based at least in part on the first iteration of the recursive tree search operation; and
selecting, based at least in part on the first path metric, a second anchor point from the second constellation points of the second transmission layer, the second anchor point being associated with a second iteration of the recursive tree search operation.

13. The method of claim 12, further comprising:
selecting, based at least in part on the second anchor point, a second subset of constellation points from the first constellation points and the second constellation points;
performing the second iteration of the recursive tree search operation based at least in part on the second anchor point and the second subset of constellation points; and
determining a second path metric based at least in part on the second iteration of the recursive tree search operation.

14. The method of claim 13, further comprising:
generating a log-likelihood ratio (LLR) associated with the data stream based at least in part on the first path metric and the second path metric.

15. The method of claim 12, wherein the performing the first iteration of the recursive tree search operation comprises:
performing a first ordering of the plurality of transmission layers, the first transmission layer being a bottom layer in the first ordering;
generating a first channel matrix based at least in part on the first ordering of the plurality of transmission layers;
performing a first QR decomposition of the first channel matrix; and
perform a first tree search based at least in part on the first QR decomposition, the first anchor point, and the first subset of constellation points.

16. The method of claim 15, wherein the first path metric is determined as a result of the first tree search.

17. The method of claim 15, wherein the performing the second iteration of the recursive tree search operation comprises:
performing a second ordering of the plurality of transmission layers, the second transmission layer being a bottom layer in the second ordering;
generating a second channel matrix based at least in part on the second ordering of the plurality of transmission layers;
performing a second QR decomposition of the second channel matrix; and
performing a second tree search based at least in part on the second QR decomposition, the second anchor point, and the second subset of constellation points.

18. The method of claim 12, wherein the first transmission layer has a higher power than the second transmission layer.

19. The method of claim 12, further comprising:
performing further iterations, wherein a number of the plurality of transmission layers is the same as that of the performed iterations.

20. The method of claim 12, further comprising:
performing further iterations, wherein a number of the plurality of transmission layers is different from that of the performed iterations.

* * * * *

UNITED STATES PATENT AND TRADEMARK OFFICE
CERTIFICATE OF CORRECTION

PATENT NO. : 11,956,055 B2
APPLICATION NO. : 17/950332
DATED : April 9, 2024
INVENTOR(S) : Bin Liu et al.

Page 1 of 1

It is certified that error appears in the above-identified patent and that said Letters Patent is hereby corrected as shown below:

On the Title Page

Amend Item [73] as follows:
Assignee: ZEKU TECHNOLOGY (SHANGHAI) CORP., LTD., Shanghai (CN)

Signed and Sealed this
Twenty-fourth Day of September, 2024

Katherine Kelly Vidal
*Director of the United States Patent and Trademark Office*